US009892183B2

(12) United States Patent
Hasegawa et al.

(10) Patent No.: US 9,892,183 B2
(45) Date of Patent: Feb. 13, 2018

(54) COMPUTER SYSTEM, COMPUTER SYSTEM MANAGEMENT METHOD, AND PROGRAM

(71) Applicant: Hitachi, Ltd., Tokyo (JP)

(72) Inventors: Toshiyuki Hasegawa, Tokyo (JP); Nobuyuki Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 309 days.

(21) Appl. No.: 14/426,996

(22) PCT Filed: Apr. 16, 2013

(86) PCT No.: PCT/JP2013/061257
§ 371 (c)(1),
(2) Date: Mar. 10, 2015

(87) PCT Pub. No.: WO2014/170952
PCT Pub. Date: Oct. 23, 2014

(65) Prior Publication Data
US 2015/0242481 A1 Aug. 27, 2015

(51) Int. Cl.
*G06F 7/00* (2006.01)
*G06F 17/30* (2006.01)

(52) U.S. Cl.
CPC .. *G06F 17/30581* (2013.01); *G06F 17/30117* (2013.01); *G06F 17/30309* (2013.01); *G06F 17/30362* (2013.01); *G06F 17/30864* (2013.01)

(58) Field of Classification Search
CPC ......... G06F 17/30581; G06F 17/30362; G06F 17/30309; G06F 17/30117; G06F 17/30864
See application file for complete search history.

(56) References Cited

U.S. PATENT DOCUMENTS 5,261,085 A 11/1993 Lamport
8,676,951 B2 * 3/2014 Shiga .................. G06F 17/3033
709/223

(Continued)

FOREIGN PATENT DOCUMENTS

JP 2009-199197 A 9/2009
WO 2012/140957 A1 10/2012
WO 2013/046352 A1 4/2013

OTHER PUBLICATIONS

Extended European Search Report received in corresponding European Application No. 13882090.7 dated Dec. 9, 2016.

(Continued)

*Primary Examiner* — Daniel Kuddus
(74) *Attorney, Agent, or Firm* — Mattingly & Malur, PC

(57) ABSTRACT

A computer system, comprising a plurality of computers coupled to one another via a network, the computer system being configured to execute a task using a database constructed from the plurality of computers, the plurality of computers including a first computer and a second computer, the second computer being configured to execute: data replication for receiving the recovery request, for reading data, and for transmitting the read data to the first computer as first replicated data; and update processing for determining, in a case where a command to update the data is received in a recovery state, the sequence number of the update command, for updating predetermined data, and for transmitting the updated predetermined data as second replicated data, the first computer or the second computer being configured to control a write order of the first replicated data and the second replicated data by the first computer.

14 Claims, 14 Drawing Sheets

(56) References Cited

U.S. PATENT DOCUMENTS

| | | | | |
|---|---|---|---|---|
| 8,832,113 B2* | 9/2014 | Tamura | ............ | G06F 17/30699 |
| | | | | 707/747 |
| 2004/0172509 A1* | 9/2004 | Takeda | ................ | G06F 11/2066 |
| | | | | 711/162 |
| 2006/0235901 A1* | 10/2006 | Chan | ........................ | H04L 47/10 |
| 2011/0082836 A1* | 4/2011 | Wang | ................ | G06F 17/30123 |
| | | | | 707/649 |
| 2011/0202564 A1* | 8/2011 | Kodaka | ............. | G06F 17/30312 |
| | | | | 707/781 |
| 2012/0284231 A1* | 11/2012 | Basescu | ............ | G06F 17/30309 |
| | | | | 707/638 |
| 2013/0250696 A1* | 9/2013 | Lee | ..................... | G11C 11/5628 |
| | | | | 365/185.22 |
| 2014/0019573 A1* | 1/2014 | Swift | .................. | H04L 67/1095 |
| | | | | 709/212 |

OTHER PUBLICATIONS

Rao, J. et al., "Using Paxos to Build a Scalable, Consistent, and Highly Available Datastore", Proceedings of the VLDB Endowment, Jan. 1, 2011, pp. 243-254, vol. 4, No. 4.

Lamport, L., "Paxos Made Simple", Sigact News, pp. 51-58, vol. 32, No. 4.

Corbett, J. C. et al., "Spanner: Google's Globally-Distributed Database", ACM Transactions on Computer Systems, Sep. 21, 2012, pp. 251-264, vol. 31, No. 3.

Chandra, T. et al., "Paxos Made Live—An Engineering Perspective (2006 Invited Talk)", Principles of Distributed Computing, Aug. 12, 2007, pp. 398-407.

Kirsch, J. et al., "Paxos for System Builders", Large-Scale Distributed Systems and Middleware, Mar. 31, 2008, pp. 1-35.

* cited by examiner

CONFIGURATION INFORMATION

| SERVER ID | KEY RANGE | | | |
|---|---|---|---|---|
| | MASTER | | SLAVE | |
| | | | | |
| SERVER 1 | 1 | 100 | 201 | 300 |
| SERVER 2 | 101 | 200 | 1 | 100 |
| SERVER 3 | 201 | 300 | 101 | 200 |
| ⋮ | ⋮ | | ⋮ | |

COMPUTER SYSTEM, COMPUTER SYSTEM MANAGEMENT METHOD, AND PROGRAM

BACKGROUND OF THE INVENTION

This invention relates to a distributed database constructed from a plurality of computers.

In recent years, data amounts have increased explosively in a computer system for executing an application using the Web, and there are known various systems for enhancing a performance of data access by distributing the data to a plurality of servers. For example, in a relational database management system (RDBMS), there is known a method involving dividing data for each predetermined range and allocating divided data to a plurality of servers, thereby enhancing an access performance of the entire system.

Moreover, as a system used in a cache server or the like, there is known a Not only SQL (NoSQL) database, such as key-value store (KVS).

In the KVS, various configurations are adopted. For example, there are known a configuration (memory store) in which data is stored in a volatile storage medium capable of accessing data at high speed, such as a memory, a configuration (disk store) in which data is stored in a non-volatile storage medium that is superior in durability of data storage, such as a solid state disk (SSD) or an HDD, and a configuration in which the above-mentioned configurations are used in combination.

The memory store and the disk store store therein a plurality of records in which data (value) and an identifier (key) of the data are linked as a pair.

In an in-memory distributed KVS, a cluster is constructed from a plurality of servers. The KVS is constructed on the memories in the servers included in the cluster. Such a configuration enables data to be accessed more quickly, and the system to be made available.

Each server constructing the distributed KVS stores data of a predetermined management range (e.g., a key range). Further, to ensure the reliability of the data in the distributed KVS, each server stores replicated data of the data included in the management range managed by another server.

Each server executes processing as a master server of the data included in the management range. In other words, in response to a read request including a predetermined key, the server managing the management range including the data corresponding to that key reads the data corresponding to the key. Further, each server operates as a slave server of replicated data of the management range managed by another server.

In the following description, data to be managed by the master server is also referred to as "master data", and data to be managed by the slave server is also referred to as "slave data".

Therefore, in the distributed KVS, even when a failure occurs in one server, another server holding replicated data of the master data of that server can continue processing as a new master server.

In the server constructing the distributed KVS, as described above, there is no such special server as a management server, and hence there is no single point of failure. Specifically, even when a failure occurs in any one of servers, another server can continue processing, and hence a computer system never stops. Accordingly, the distributed KVS can also ensure a fault tolerance.

It should be noted that the computer system can arbitrarily determine the number of slave servers, that is, the number of servers to which the replicated data is to be stored. The number of slave servers for one management range is hereinafter also referred to as "multiplicity".

When one of the servers constructing the distributed KVS stops, the multiplicity of the distributed KVS decreases by one. If the number of servers that stop is equal to or more than the multiplicity of the distributed KVS, a business task using the distributed KVS cannot continue. It is therefore necessary to quickly reestablish the multiplicity of the distributed KVS. In the following description, reestablishing the multiplicity of the distributed KVS is referred to as "recovery".

During the recovery of the distributed KVS, processing such as the following is executed.

First, processing for starting up a new server to serve as a replacement of the server in which the failure occurred is executed.

Second, data replication for writing the data held by the server in which the failure occurred to a new server is executed. Specifically, the server holding the replicated data of the data held by the server in which the failure occurred transmits the replicated data to the new server. At this stage, it is necessary for the replication source server and the replication destination server to hold the same data. Therefore, when the data held by the replication source server has been updated, the updated data needs to be written to the replication destination server.

Third, processing for adding the new server to the cluster is executed.

Examples of an application for utilizing the distributed KVS include online system commercial transactions, such as banking and Internet shopping. In order for the application to continue processing, recovery needs to be carried out without stopping the distributed KVS.

SUMMARY OF THE INVENTION

Regarding distributed KVS recovery processing such as that described above, a technology disclosed in JP 2009-199197 A is known.

In JP 2009-199197 A, it is disclosed that "(1) A snapshot of all the data in a memory of an operating copy source computer at a certain time point is obtained, transferred to a copy destination computer, and written to a memory of the copy destination computer. (2) During the execution of (1), updates to the data in the memory of the copy source computer are continuously monitored, and differential data relating to the detected updates are repeatedly transferred to the copy destination computer and written to the memory of the copy destination computer. (3) When the size of the differential data becomes equal to or less than the size capable of being stored in one transmission message, the differential data is lastly transferred and written to the memory of the copy destination computer at one time, and the processing of the copy destination computer is restarted in synchronization with the copy source computer."

However, with the technology disclosed in JP 2009-199197 A, the replication source computer needs to obtain a snapshot, which increases the amount of used memory. Consequently, the memory allocated to the distributed KVS may be insufficient, and the performance of the overall system may deteriorate.

Further, the communication performance of the overall system may also deteriorate due to an increase in the amount of used communication bandwidth (communication amount) involved in transmission of the snapshot. Further, when the data is updated after the snapshot is obtained, there occurs a problem in that data that does not need to be transmitted is transmitted because the replication source computer transmits the differential data to the replication destination computer. For example, during transmission of the snapshot, when a portion of the data is deleted by update processing, there occurs a problem in that differential data that does not need to be transmitted is transmitted.

Further, when the replication source computer is synchronized with the replication destination computer, the user program (application) needs to be stopped.

It is an object of this invention to enable a system constructing a distributed KVS to recover without stopping an application while suppressing the amount of used memory and the amount of used communication bandwidth.

The present invention can be appreciated by the description which follows in conjunction with the following figures, wherein: a computer system, comprising a plurality of computers coupled to one another via a network, the computer system being configured to execute a business task using a database constructed from storage areas included in each of the plurality of computers. The database is configured to store a plurality of pieces of data, each data includes information identifying the data, a value of the data, and a sequence number which is an execution order of an event in the database. The plurality of pieces of data is allocated in a distributed manner across the each of the plurality of computers for each management area determined by applying a partitioning algorithm for a distributed data store to the information identifying the data. The each of the plurality of computers includes: a data management module configured to manage the allocated data; a data control module configured to determine the sequence number of an operation on the allocated data; and a recovery control module configured to transmit replicated data of data included in a predetermined management area to a newly added computer. The plurality of computers includes a first computer configured to transmit a recovery request and a second computer configured to receive the recovery request. The second computer is configured to execute: data replication for receiving the recovery request from the first computer, for shifting a state of the second computer to a recovery state, for reading at least one piece of data from the database based on the sequence number, and for transmitting the read at least one piece of data to the first computer as first replicated data; and update processing for determining, in a case where a command to update the data is received in the recovery state, the sequence number of the update command, for updating predetermined data based on the update command, and for transmitting the updated predetermined data as second replicated data. At least one of the first computer or the second computer is configured to control a write order of the first replicated data and the second replicated data by the first computer. The first computer is configured to execute write processing for writing, based on the write order, the first replicated data and the second replicated data to the storage areas constructing the database.

According to one embodiment of this invention, it is possible to enable the recovery of the computer system while suppressing the amount of used memory and the amount of used communication bandwidth. Further, the system can recover without stopping the business task (application).

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

First, an outline of this invention is described.

Figure 1:
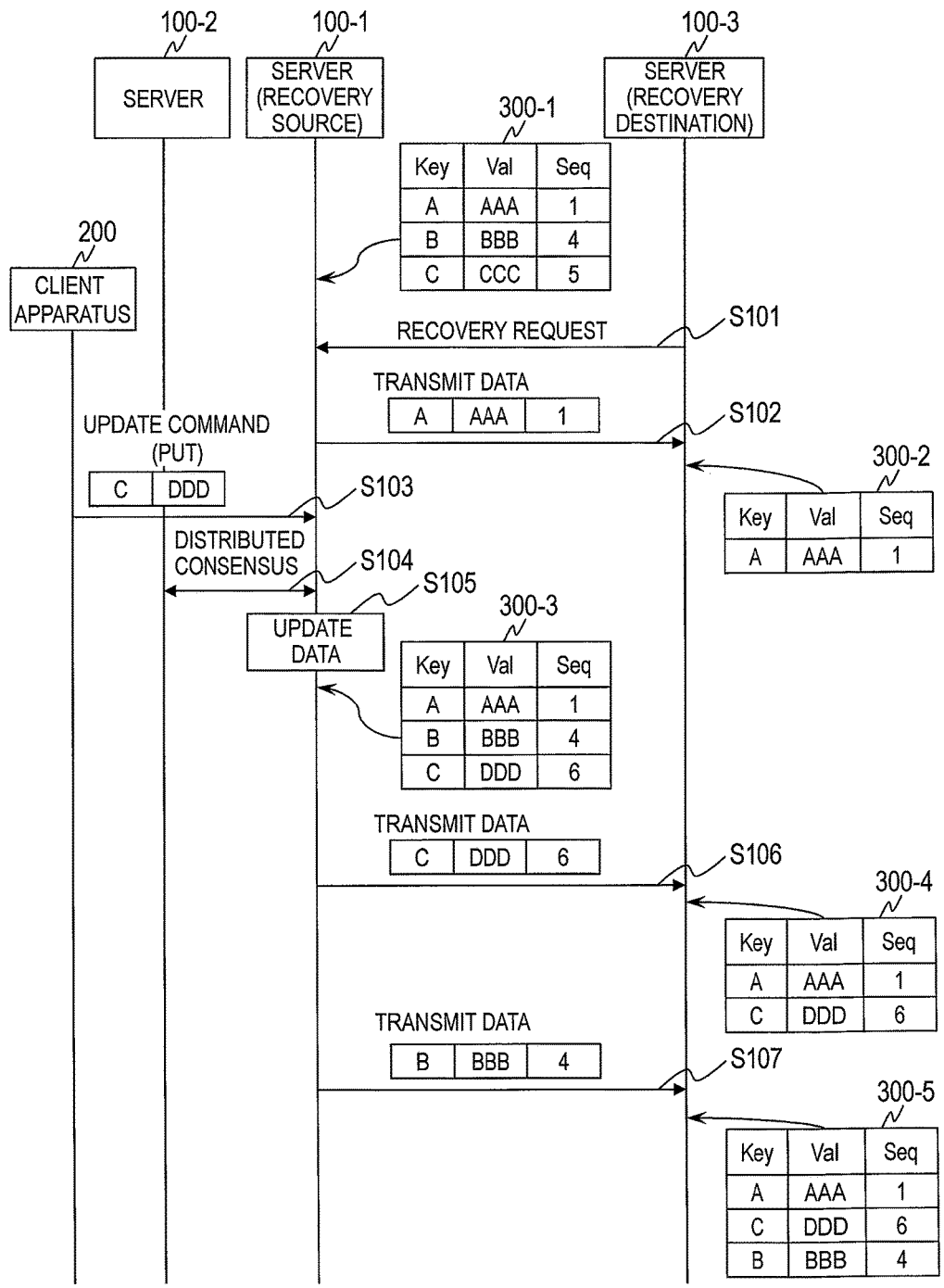
FIG. 1 is a sequence diagram illustrating an outline of this invention.

FIG. 1 is a sequence diagram illustrating an outline of this invention.

A computer system illustrated in FIG. 1 is configured from three servers 100 and one client apparatus 200. The three servers 100 construct a cluster. A distributed database is built on storage areas that those servers 100 have. In this embodiment, a distributed KVS is used as the distributed database. A plurality of pieces of data in which keys, values, and sequence numbers are associated with one another are stored in the distributed KVS according to this embodiment. In the following description, the cluster of servers 100 constructing the distributed KVS is referred to simply as "cluster".

As used herein, the "sequence number" is a value indicating an execution order of events in the distributed KVS. In this embodiment, each event is given a sequence number in order from the number "1". The events of the distributed KVS indicate an operation performed on the data (update processing), and a configuration change of the computer system.

Further, each server 100 included in the cluster includes data for each key range determined based on a partitioning algorithm for a distributed data store. Each server 100 stores data in which keys, values, and sequence numbers are associated with one another as data management information 300 in a data store 160 illustrated in FIG. 2.

As used herein, the "key range" represents a range of hash values calculated from the key of each piece of data. It should be noted that various methods may be employed as the partitioning algorithm for a distributed data store, such as a consistent hashing method, a range method, a list method, and the like.

Each server 100 is configured to operate as a master server for managing data (master data) included in a predetermined key range. Further, each server 100 holds replicated data (slave data) of the data included in a key range managed by another server 100, and is configured to operate as a slave server.

FIG. 1 illustrates recovery processing of a distributed KVS. In the following description, the key range managed as a master by a server 100 in which a failure has occurred is also referred to as "target key range".

A server 100-1 is the master server for a current target key range. A server 100-3 is a server to be added as a new master server of the target key range.

The server 100-1 stores master data of the target key range, such as the data represented by data management information 300-1. It should be noted that same slave data is also stored in a server 100-2.

The server 100-3 transmits a recovery request to the server 100-1 (Step S101). In a case where the server 100-1 receives the recovery request, the server 100-1 shifts to a recovery state.

At this stage, as information specifying the range of the transmission target data, the server 100-1 stores the largest sequence number among the sequence numbers included in the master data. In other words, the server 100-1 stores the newest sequence number. Then, the server 100-1 starts data replication. In the following description, the sequence number stored by the replication source server 100 when starting the data replication is also referred to as "replication sequence number".

The server 100-1 transmits replicated data of the data indicated by the key "A" to the server 100-3 (Step S102). The server 100-3 stores the received replicated data in the data store 160 illustrated in FIG. 2. At this stage, the master data held by the server 100-3 is as shown in data management information 300-2.

During the recovery state, when an update command for updating a value indicated by the key "C" to "DDD" is received (Step S103), the server 100-1 determines the sequence number of the update command in cooperation with the server 100-2 based on a distributed consensus algorithm (Step S104). At this stage, the data replication is temporarily stopped.

In the following description, the process of determining the execution order of an operation performed on the distributed KVS by the plurality of servers 100 based on the distributed consensus algorithm is also referred to as "distributed consensus". It should be noted that in this embodiment, a Paxos algorithm is used as the distributed consensus algorithm.

The server 100-1 transmits a replica of the update command to the server 100-2, and performs distributed consensus relating to the update command. In the example illustrated in FIG. 1, the sequence has been determined until the sequence number "5", and hence the sequence number of the received update command is determined as "6". Consequently, the server 100-2 also executes the same data update processing.

Figure 5:
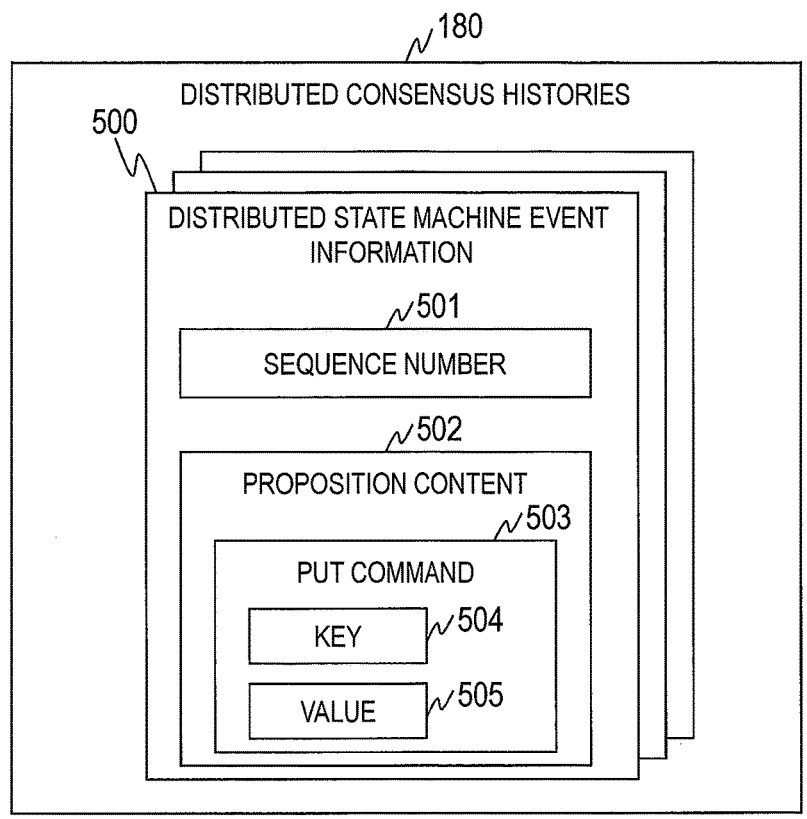
FIG. 5 is an explanatory diagram illustrating an example of distributed consensus histories according to the first embodiment of this invention.

The server 100-1 updates the master data based on the update command (Step S105). Specifically, the server 100-1 stores "DDD" as the value of the data corresponding to the key "C", and stores "6" as the sequence number. At this stage, the master data is as shown in data management information 300-3. It should be noted that the server 100-2 updates the data in the same manner based on distributed state machine event information 500 generated by performing distributed consensus, which is illustrated in FIG. 5.

The server 100-1 transmits replicated data of the updated data to the server 100-3 (Step S106). The server 100-3 stores the received replicated data in the data store 160 illustrated in FIG. 2. At this stage, the master data held by the server 100-3 is as shown in data management information 300-4.

After the update processing of the data is completed, the server 100-1 restarts data replication.

The server 100-1 transmits replicated data of the data indicated by the key "B" to the server 100-3 (Step S107). The server 100-3 stores the received replicated data in the data store 160 illustrated in FIG. 2. At this stage, the master data held by the server 100-3 is as shown in data management information 300-5. It should be noted that the order of the data in the data management information 300-5 indicates the write order of data by the server 100-3. Therefore, the server 100-3 holds master data having the same format as the management information 300-3.

Here, all of the data including a sequence number equal to or less than the replication sequence number has been transmitted, and hence the server 100-1 finishes the data replication.

In this invention, the replication source server 100-1 is capable of transmitting all of the data to the replication destination server 100-3 without obtaining a snapshot. Because data having a small data size is transmitted, and, because the newest data is transmitted, the amount of communication bandwidth used for recovery processing can be suppressed.

Further, there is no need to stop the system in order to maintain data consistency, and, there is no need to synchronize the server 100-1 with the server 100-3.

Therefore, system recovery can be carried out with a reduced burden on the network during recovery processing in a manner that allows services to be continued.

First Embodiment

Figure 2:
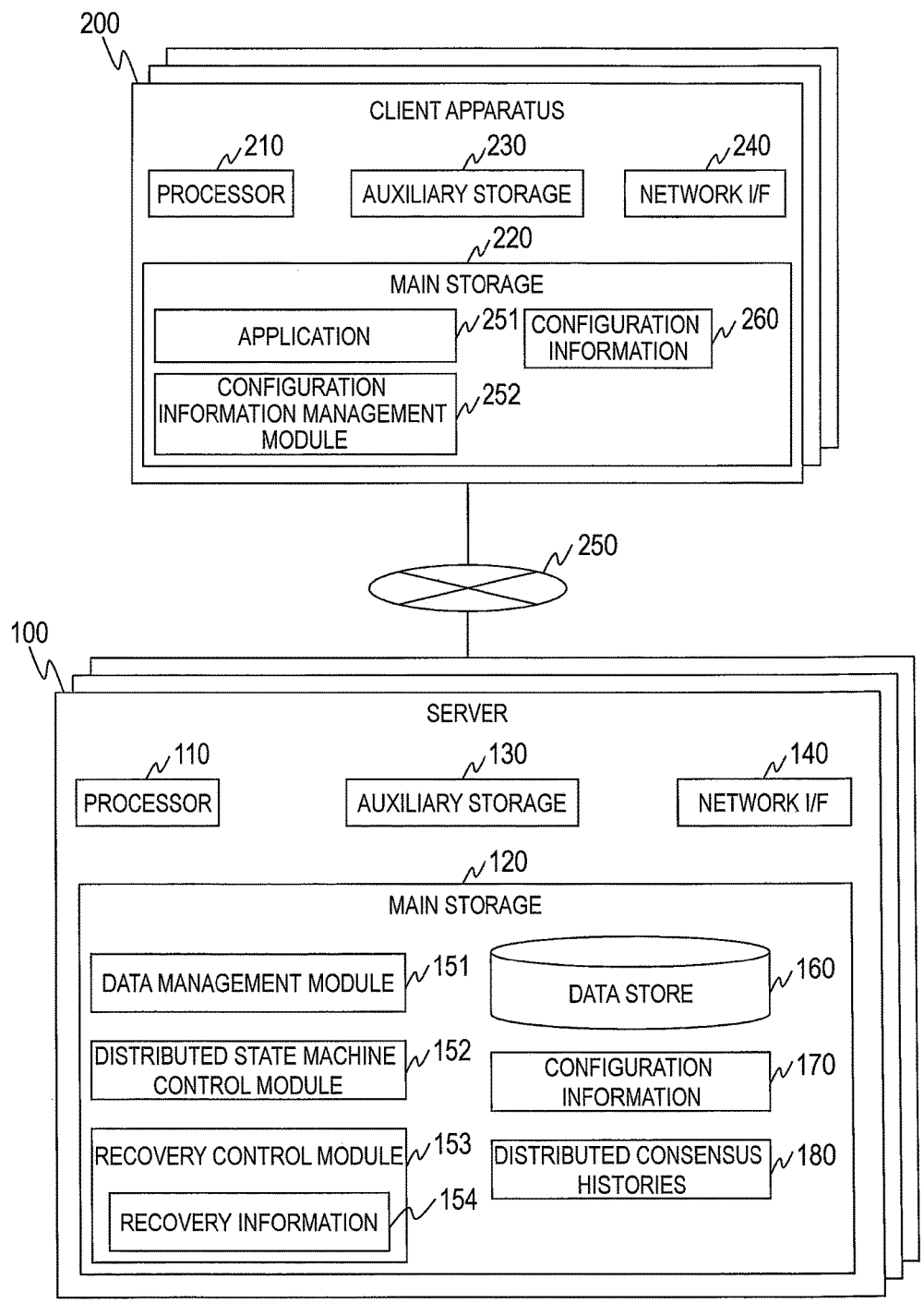
FIG. 2 is a block diagram illustrating a configuration of a computer system according to a first embodiment of this invention.

FIG. 2 is a block diagram illustrating a configuration of a computer system according to a first embodiment of this invention.

The computer system includes a plurality of servers 100 and a client apparatus 200. The servers 100 are coupled to one another via a network 250, and each of the servers 100 and the client apparatus 200 are also coupled to each other via the network 250.

The network 250 may conceivably have various wired and wireless configurations, such as a LAN, a WAN and a SAN. This invention may use any type of network as long as the network to be used enables communication between the servers 100 and the client apparatus 200. It should be noted that the network 250 includes a plurality of network apparatus (not shown). The network apparatus include, for example, a switch and a gateway.

Each server 100 includes a processor 110, a main storage 120, an auxiliary storage 130, and a network interface 140. The distributed KVS is constructed by a plurality of the servers 100. Each server 100 executes various processes based on requests transmitted from the client apparatus 200. Each server 100 has the same configuration.

It should be noted that each server 100 may also include an input device, such as a keyboard, a mouse, and a touch panel, and an output device, such as a display.

The processor 110 executes programs stored in the main storage 120. Functions of the server 100 can be implemented by the processor 110 executing the programs. When a program is a subject in a sentence in the following description of processing, it represents that the program is executed by the processor 110.

The main storage 120 stores the programs to be executed by the processor 110 and information necessary for executing those programs. The main storage 120 may conceivably be, for example, a memory.

On the main storage 120 of this embodiment, programs for implementing a data management module 151, a distributed state machine control module 152, and a recovery control module 153 are stored. Further, on the main storage 120, configuration information 170 and distributed consensus histories 180 are stored as the necessary information.

Further, the data store 160, which is a database constructing the distributed KVS, is stored on the main storage 120. In the data store 160 of this embodiment, the data in which a key, a value, and a sequence number are linked as a pair is stored. It should be noted that in the data store 160 of each server 100, the master data and the slave data are stored.

The auxiliary storage 130 stores various types of information. The auxiliary storage 130 may conceivably be, for example, an HDD or an SSD. It should be noted that on the auxiliary storage 130, a disk store (not shown) constructing the distributed KVS may be built.

The network interface 140 is an interface for coupling to another apparatus via the network 250.

Now, the programs and information stored in the main storage 120 are described.

The data management module 151 is configured to control each process performed on the data managed by the servers 100. The data management module 151 receives commands transmitted from the client apparatus 200, and controls read processing, write processing, and the like of the data based on those commands. Further, the data management module 151 also executes processing such as asking about data to another server 100 and transmitting a processing result to the client apparatus 200.

The distributed state machine control module 152 is configured to control the data consistency of the distributed KVS in each server 100. Specifically, the distributed state machine control module 152 determines the sequence number, which is the execution order of an event input into the distributed KVS, by communicating to and from the distributed state machine control module 152 of another server 100.

As used herein, a "state machine" is a system in which the behavior of a target is expressed using "states" and "events". The state machine internally holds a current state, and shifts states based on a predetermined rule in a case where an event is input from outside.

A distributed state machine is a mechanism in a distributed system for controlling one or more state machines that are on a plurality of servers to execute the same behavior (see, for example, U.S. Pat. No. 5,261,085 A). In order for a plurality of state machines to perform the same behavior, the same events need to be input into each state machine in the same input order. Therefore, a distributed consensus algorithm is used to determine the order in which the events are input.

When an operation, such as an update command on a key, is considered to be an event, and an update of the data for that operation is considered to be a shift in the state, a KVS can be handled as a group of state machines for each key. Therefore, for a distributed KVS, a distributed state machine can be used as a configuration that enables each server included in the cluster to hold the same data.

However, in a case where a state machine is operated for each key, the number of state machines becomes very large, and hence such an operation method is not realistic. For example, in a case where the data amount of all the keys is 4 bytes, the number of required state machines is 4 billion.

Therefore, it is desirable to operate one state machine per a given group of keys. In other words, one state machine may be provided for a key range. It should be noted that in this embodiment, for ease of description, one state machine is present per server 100. In this case, one distributed state machine control module 152 is included in each server 100.

The recovery control module 153 is configured to control recovery processing. The recovery control module 153 of the replication destination server 100 transmits a recovery request to the replication source server 100, and stores the data transmitted from the replication source in the data store 160. The recovery control module 153 of the replication source server 100 transmits the data to the replication destination server 100.

The recovery control module 153 holds recovery information 154 to be used in the recovery processing. The recovery information 154 is described in detail below with reference to FIG. 6.

The configuration information 170 stores information indicating a storage destination of the data. In other words, the configuration information 170 stores information indicating the master server and the slave server of each key range. It should be noted that the configuration information 170 is described in detail below with reference to FIG. 4. The distributed consensus histories 180 store information relating to consensus content of an event. The distributed consensus histories are described in detail below with reference to FIG. 5.

Next, the client apparatus 200 is described. The client apparatus 200 includes a processor 210, a main storage 220, an auxiliary storage 230, and a network interface 240. The client apparatus 200 is configured to transmit to the server 100 an update command requesting execution of various processes.

The processor 210 executes programs stored in the main storage 220. Functions of the client apparatus 200 can be implemented by the processor 210 executing the programs. When a program is a subject in a sentence in the following description of processing, it represents that the program is executed by the processor 210.

The main storage 220 stores the programs to be executed by the processor 210 and information necessary for executing those programs. The main storage 220 may conceivably be, for example, a memory.

On the main storage 220 of this embodiment, programs for implementing an application 251 and a configuration information management module 252 are stored. Further, on the main storage 220, configuration information 260 is stored as the necessary information.

The auxiliary storage 230 stores various types of information. The auxiliary storage 130 may conceivably be, for example, an HDD or an SSD.

The network interface 240 is an interface for coupling to another apparatus via the network 250.

Now, the programs and information stored in the main storage 220 are described.

The application 251 transmits an update command to the server 100. Further, the application 251 receives a result of processing performed in response to an access request transmitted from the server 100.

The update command is a command for requesting that an operation be performed on the data, that is, update processing be executed on the data. Examples of update processing include writing data, overwriting data, and deleting data.

The configuration information management module 252 is configured to manage the configuration information 260 for managing the storage destination of the data.

The configuration information 260 stores information indicating the storage destination of the data. The configuration information 260 is the same information as the configuration information 170.

It should be noted that in this embodiment, although the functions included in the servers 100 and the client apparatus 200 are implemented using software, the same functions may also be implemented using dedicated hardware.

Figures 3, 4:
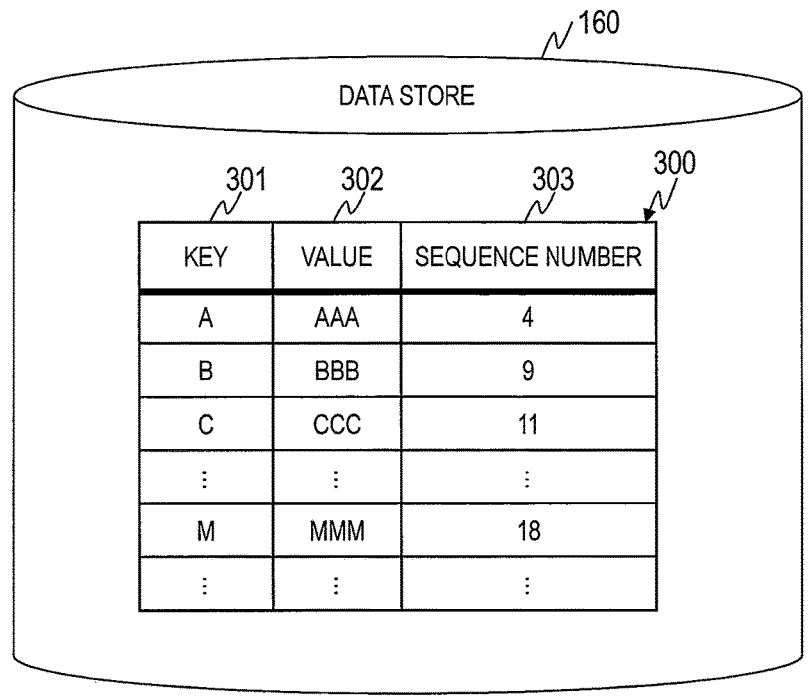
FIG. 3 is an explanatory diagram showing a format of data stored in a data store according to the first embodiment of this invention.
FIG. 4 is an explanatory diagram showing an example of configuration information according to the first embodiment of this invention.

FIG. 3 is an explanatory diagram showing a format of data stored in the data store 160 according to the first embodiment of this invention.

In this embodiment, the data store 160 stores data management information 300. The data management information 300 includes a plurality of pieces of data, each being constructed from a key, a value, and a sequence number. The data that is constructed from a key, a value, and a sequence number is hereinafter also referred to as "key-value data".

The data management information 300 includes a key 301, a value 302, and a sequence number 303.

The key 301 stores an identifier (key) for identifying data. The value 302 stores actual data (value). The sequence number 303 stores a value indicating the execution order of update processing (event) corresponding to the key 301.

A user who operates the client apparatus 200 can save data to the distributed KVS by designating the key 301. The user can also obtain desired data from the distributed KVS by designating the key 301.

Each of the servers 100 manages the key-value data for each predetermined range of keys 301 (key range). In other words, for each key range, the key-value data is allocated to each server 100 in a distributed manner. The server 100 thus executes processing as the master server for data included in the assigned management range 400. This configuration enables a large amount of data to be processed in parallel and at high speed.

It should be noted that the format of the data to be stored in the data store 160 is not limited to the format shown in FIG. 3. For example, the data to be stored in the data store 160 may have a format in which a hash value of a key, a value, and a sequence number are associated with one another.

FIG. 4 is an explanatory diagram showing an example of the configuration information 170 according to the first embodiment of this invention.

The configuration information 170 stores information on the key range of data allocated to each of the servers 100.

Specifically, the configuration information 170 includes a server ID 401 and a key range 402.

The server ID 401 stores an identifier for uniquely identifying the server 100. For example, the server ID 401 stores an identifier, an IP address, a MAC address, and the like of the server 100.

The key range 402 stores a range of hash values for specifying a key range. The key range 402 includes a master 403 and a slave 404. The master 403 stores hash values for specifying the key range of the master data. The slave 404 stores hash values for specifying the key range of the slave data of each server 100.

It should be noted that the number of columns for the slave 404 is equal to the multiplicity. In the example shown in FIG. 4, the number of columns for the slave 404 shows that the distributed KVS has a multiplicity of 1.

FIG. 5 is an explanatory diagram illustrating an example of the distributed consensus histories 180 according to the first embodiment of this invention.

The distributed consensus histories 180 include a plurality of pieces of distributed state machine event information 500. Each piece of distributed state machine event information 500 stores information about an event in the distributed KVS. Specifically, each piece of distributed state machine event information 500 includes a sequence number 501 and proposition content 502.

The sequence number 501 stores a value indicating an execution order of an event. The proposition content 502 stores the specific content of the event. The proposition content 502 illustrated in FIG. 5 stores a put command 503 including a key 504 and a value 505.

In this embodiment, there are distributed consensus histories 180 for each key range.

Figure 6:
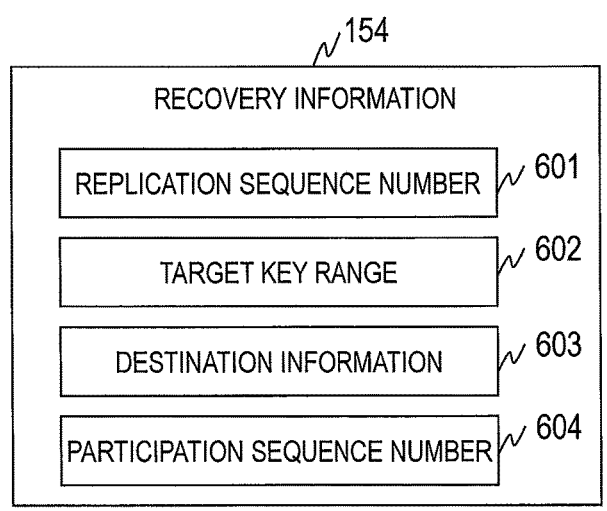
FIG. 6 is an explanatory diagram illustrating an example of recovery information according to the first embodiment of this invention.

FIG. 6 is an explanatory diagram illustrating an example of the recovery information 154 according to the first embodiment of this invention. The recovery information 154 includes a replication sequence number 601, a target key range 602, destination information 603, and a participation sequence number 604.

The replication sequence number 601 stores a replication sequence number. The target key range 602 stores a hash value specifying a target key range. The destination information 603 stores information for specifying the replication destination server 100. For example, the destination information 603 stores an IP address of the server 100, a port number of the server 100, and the like.

The participation sequence number 604 stores a sequence number indicating the execution order of an event for adding a new server 100 to the cluster. In the following description, an event for adding a new server 100 to the cluster is also referred to as "member participation event".

Figure 7:
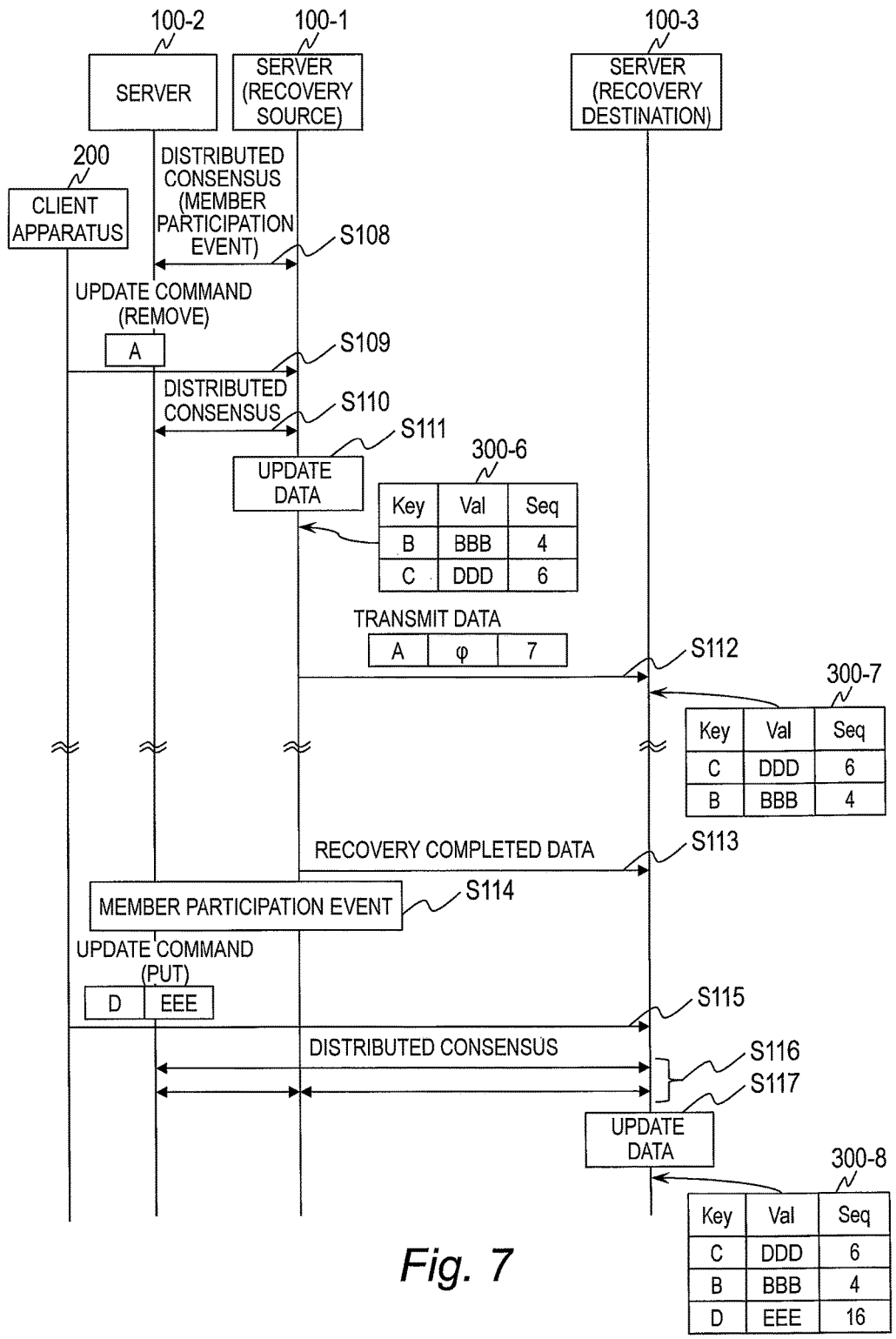
FIG. 7 is a sequence diagram illustrating an outline of this invention.

FIG. 7 is a sequence diagram illustrating an outline of this invention. FIG. 7 illustrates processing executed after Step S107 of FIG. 1.

The server 100-1 transmits all of the replication target data to the server 100-3 (Step S107), and then performs distributed consensus of a member participation event with the server 100-2 (Step S108). Based on this processing, the sequence number of the member participation event is determined. In the following description, the sequence number of the member participation event is also referred to as "participation sequence number".

The server 100-1 stores the determined participation sequence number in the recovery information 154. Until the member participation event is executed, the server 100-1 performs processing as the master server of the target key range. In other words, update commands assigned with a sequence number smaller than the participation sequence number are processed by the server 100-1.

In the example illustrated in FIG. 7, the participation sequence number is determined as "15".

After the distributed consensus of the member participation event has been performed, the server 100-1 and the server 100-2 start execution of that member participation event. However, at this point, the sequence number is not yet "15", and hence the server 100-1 and the server 100-2 wait for a fixed period. After the fixed period has elapsed, in a case where the sequence number is smaller than the participation sequence number, the server 100-1 and the server 100-2 perform distributed consensus of a NOOP command, and add the value of the sequence number.

The client apparatus 200 transmits to the server 100-1 an update command for deleting the data of the key "A" (Step S109). At this point, the server 100-3 has not been added to the cluster, and hence the update command is transmitted to the server 100-1.

In a case where the update command is received, the server 100-1 performs distributed consensus with the server 100-2 (Step S110). In the example illustrated in FIG. 7, the sequence number of the received update command is determined as "7".

The server 100-1 updates the master data based on the update command (Step S111). Specifically, the server 100-1 deletes the data of the key "A". At this stage, the master data is as shown in data management information 300-6. It should be noted that the server 100-2 updates the data in the same manner based on the distributed state machine event information 500 generated by performing distributed consensus.

The server 100-1 transmits to the server 100-3 data instructing deletion of the data (Step S112). The server 100-3 deletes the data. At this stage, the master data held by the server 100-3 is as shown in data management information 300-7.

The server 100-1 executes the processing from Step S110 to Step S112 until the sequence number is "15".

In a case where the sequence number of a predetermined event is "14", the member participation event occurs next. Here, the server 100-1 transmits to the server 100-3 recovery completed data including the participation sequence number (Step S113), and then releases the recovery state.

Further, the server 100-1 and the server 100-2 execute the member participation event (Step S114).

It should be noted that at this point the configuration information 170 is updated so that the server 100-3 is added as the new master server. Specifically, the server 100-1 adds an entry for the server 100-3 to the configuration information 170, and sets the server 100-3 as the master server. The server 100-2 and the server 100-3 also perform the same processing. In addition, the server 100-1 transmits the updated configuration information 170 to the server 100-3 and the client apparatus 200.

Based on this processing, the server 100-3 is added to the cluster, and, the server 100-3 processes update commands on the data included in the target key range.

Subsequently, the client apparatus 200 transmits to the server 100-3 an update command for adding data having the key "D" and the value "EEE" (Step S115).

The server 100-3 performs distributed consensus with the server 100-1 and the server 100-2 (Step S116), and determines "16" to be the sequence number of the received update command.

The server 100-3 updates the master data based on the update command (Step S117). Specifically, the server 100-3 stores data having the key "D", the value "EEE", and the sequence number "16". The server 100-1 and the server 100-2 each update the data in the same manner based on the distributed state machine event information 500 transmitted during execution of the distributed consensus. At this stage, the master data is as shown in data management information 300-8.

Figure 8:
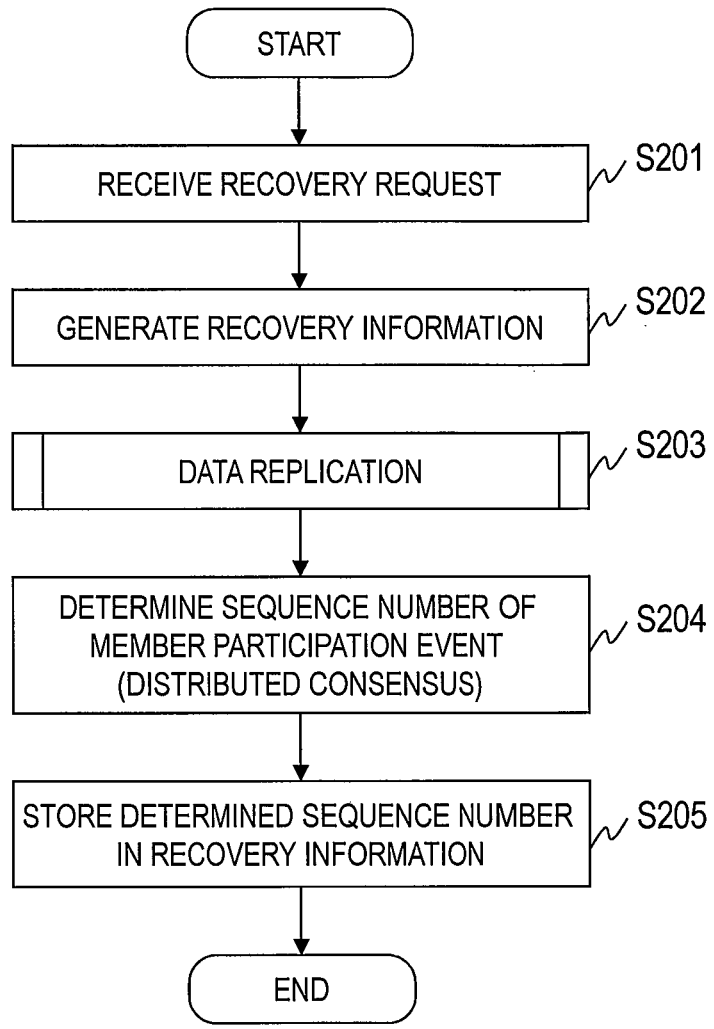
FIG. 8 is a flowchart illustrating recovery processing executed by a replication source server according to the first embodiment of this invention.

FIG. 8 is a flowchart illustrating recovery processing executed by the replication source server 100 according to the first embodiment of this invention.

The server 100 receives a recovery request from another server 100 (Step S201). Specifically, the recovery control module 153 receives the recovery request. The recovery request includes a hash value for specifying the target key range and destination information about the replication destination server 100.

Based on the received recovery request, the server 100 generates recovery information 154 (Step S202). Specifically, processing such as that described below is executed.

The recovery control module 153 obtains the hash value of the target key range and the destination information included in the recovery request. The recovery control module 153 outputs an obtaining request for the replication sequence number to the distributed state machine control module 152. It should be noted that the obtaining request includes a hash value of the target key range.

The distributed state machine control module 152 retrieves the distributed state machine event information 500 corresponding to the target key range based on the hash value of the target key range included in the obtaining request. In addition, the distributed state machine control module 152 refers to a sequence number 501 of the retrieved distributed state machine event information 500, and obtains the largest sequence number. In other words, the newest sequence number is obtained.

The distributed state machine control module 152 outputs the obtained sequence number to the recovery control module 153 as the replication sequence number.

The recovery control module 153 generates the recovery information 154 based on the hash value of the key range, the destination information, and the replication sequence number. Then, the recovery control module 153 shifts to a recovery state.

It should be noted that at this point, the participation sequence number 604 is not included in the recovery information 154.

The above is a description of the processing performed in Step S202.

Next, the server 100 executes data replication (Step S203). The data replication is described in more detail below with reference to FIG. 9.

In a case where it is determined that all of the replication target data has been transmitted, the server 100 determines the sequence number of the member participation event, namely, the participation sequence number, based on a distributed consensus algorithm (Step S204). Specifically, the recovery control module 153 instructs the distributed state machine control module 152 to perform distributed consensus of the member participation event. The specific processing is described below with reference to FIG. 9.

Next, the server 100 stores the determined participation sequence number in the recovery information 154 (Step S205), and finishes the processing.

It should be noted that in a case where a difference between the participation sequence number and the replication sequence number is large, in a system that does not perform updates frequently, the replication destination server 100 cannot be added to the cluster until the event having the participation sequence number occurs. In this case, after executing the processing of Step S205, the distributed state machine control module 152 waits a fixed period for the member participation event to occur. In a case where the sequence number after the fixed period has elapsed is smaller than the participation sequence number, the distributed state machine control module 152 performs distributed consensus of a NOOP command a predetermined number of times.

Figure 9:
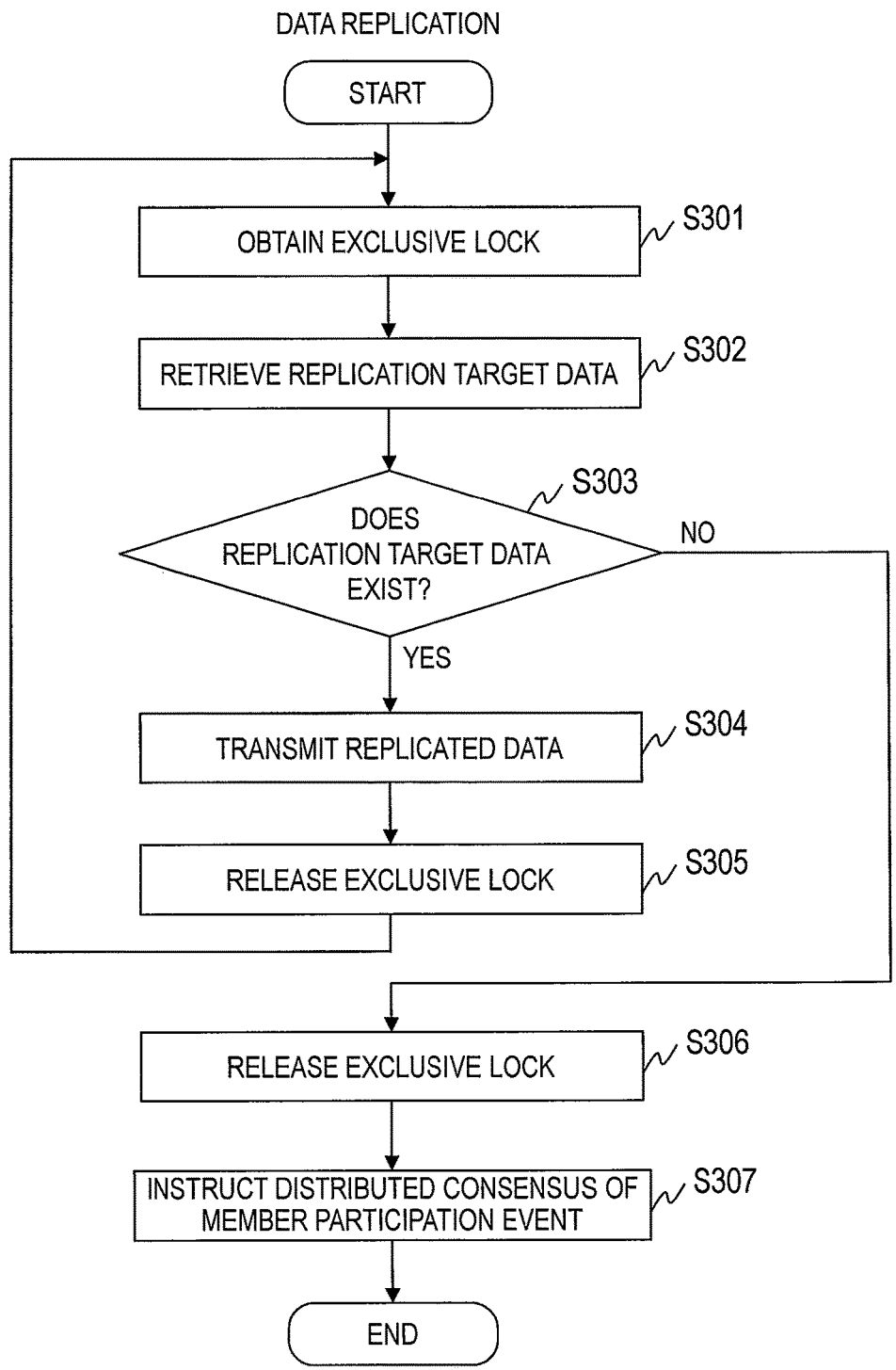
FIG. 9 is a flowchart illustrating data replication executed by the replication source server according to the first embodiment of this invention.

FIG. 9 is a flowchart illustrating data replication executed by the replication source server 100 according to the first embodiment of this invention. The data replication is executed under the control of the recovery control module 153.

The recovery control module 153 obtains an exclusive lock of the data included in the target key range (Step S301). The exclusive lock prevents data update processing from being executed on the target key range. Consequently, data replication and data update processing can be prevented from being carried out simultaneously.

It should be noted that in a case where the exclusive lock of the target key range has been obtained by the data update processing, the recovery control module 153 waits until the exclusive lock is released.

The recovery control module 153 retrieves the replication target data from among the data included in the target key range (Step S302).

Specifically, the recovery control module 153 refers to the data management information 300 in the data store 160 and the recovery information 154, and retrieves data that has not yet been transmitted and includes an older sequence number than the replication sequence number from among the data included in the target key range. In this embodiment, the recovery control module 153 retrieves data including a sequence number that is larger than the sequence numbers of the data that has already been transmitted, and equal to or less than the replication sequence number.

The recovery control module 153 determines whether or not replication target data exists based on the retrieval result (Step S303). In other words, the recovery control module 153 determines whether or not all of the replication target data has been transmitted.

In a case where it is determined that replication target data exists, the recovery control module 153 reads the retrieved data, and transmits the read data as replicated data to the replication destination server 100 (Step S304). Specifically, the recovery control module 153 executes processing such as that described below.

The recovery control module 153 selects the data to be transmitted from the retrieved data. Examples of the selection method include selecting the data in ascending order of the sequence number, and selecting the data in order of registration of a key dictionary. Further, one piece of data may be selected, or two or more pieces of data may be selected. In this embodiment, the number of pieces of data to be selected is one. It should be noted that information relating to the method of selecting the data and the number of pieces of data to be selected may be set in advance in the recovery control module 153, or may be included in the recovery request.

The recovery control module 153 reads the selected data from the data store 160, and the read data is transmitted to the recovery control module 153 of the replication destination server 100 as replicated data.

The above is a description of the processing performed in Step S304.

Next, the recovery control module 153 releases the exclusive lock on the target key range (Step S305), and returns to Step S301.

In Step S303, in a case where it is determined that replication target data does not exist, the recovery control module 153 releases the exclusive lock on the target key range (Step S306). Then, the recovery control module 153 instructs the distributed state machine control module 152 to perform distributed consensus of the member participation event (Step S307), and finishes the processing. At this stage, the distributed state machine control module 152 executes processing such as that described below.

In a case where the distributed state machine control module 152 receives this instruction, the distributed state machine control module 152 communicates to and from the distributed state machine control module 152 of another server 100 based on a distributed consensus algorithm, delivers the processing content of the member participation event, and determines the participation sequence number.

The distributed state machine control module 152 of each server 100 stores distributed state machine event information 500 including the proposition content 502 of the member participation event in the distributed consensus histories 180.

The proposition content 502 includes, as the processing content of the member participation event, information for updating the configuration information 170, and information for calculating the participation sequence number. The information for updating the configuration information 170 includes information corresponding to the target key range 602 and the destination information 603. Further, the information for calculating the participation sequence number includes a conditional expression.

For example, a conditional expression may be used that adds a predetermined value to the sequence number 501 given to the distributed state machine event information 500 corresponding to the member participation event, and sets the calculated value as the participation sequence number. Further, a conditional expression may be used that multiplies the sequence number 501 by a predetermined value, and sets the calculated value as the participation sequence number. It should be noted that the conditional expression used in this invention to calculate the participation sequence number is not limited to any conditional expression.

After distributed consensus of the member participation event has been performed, the distributed state machine control module 152 of each server 100 calculates the participation sequence number based on the proposition content 502 of the member participation event. Further, the distributed state machine control module 152 of each server 100 outputs the calculated participation sequence number to the recovery control module 153. The recovery control module 153 holds the input participation sequence number.

The distributed state machine control module 152 of each server 100 enters a standby state for a fixed period. In a case where the sequence number matches the participation sequence number, the distributed state machine control module 152 of each server 100 executes the member participation event that had been on standby. At this stage, the distributed state machine control module 152 instructs the data management module 151 to update the configuration information 170. This instruction includes information corresponding to the target key range 602 and the destination information 603.

The data management module 151 retrieves an entry from the replication source server 100 by referring to the configuration information 170.

The data management module 151 updates the hash value so that the target key range 602 is removed from the master 403 of the retrieved entry. Further, the data management module 151 updates the hash value so that the target key range 602 is included in the slave 404 of the retrieved entry.

In addition, the data management module 151 adds a new entry to the configuration information 170, and stores an identifier of the replication destination server 100 in a server ID 401 based on the destination information 603. Further, the data management module 151 stores the hash value of the target key range 602 in the master 403 of that entry. In addition, the data management module 151 stores a predetermined hash value in the slave 404 of that entry.

Various methods may be used to determine the hash value of the slave 404. For example, at least one server 100 may hold the hash value of the master 403 and the slave 404 of the server in which a failure occurred as a history, and determine the hash value of the slave 404 based on that history. Further, the hash value of the slave 404 may also be determined so as to satisfy the multiplicity of the distributed KVS by referring to the slave 404 in an entry of another server 100. It should be noted that the method used in this invention to determine the hash value to be stored in the slave 404 is not limited to any method.

Figure 10:
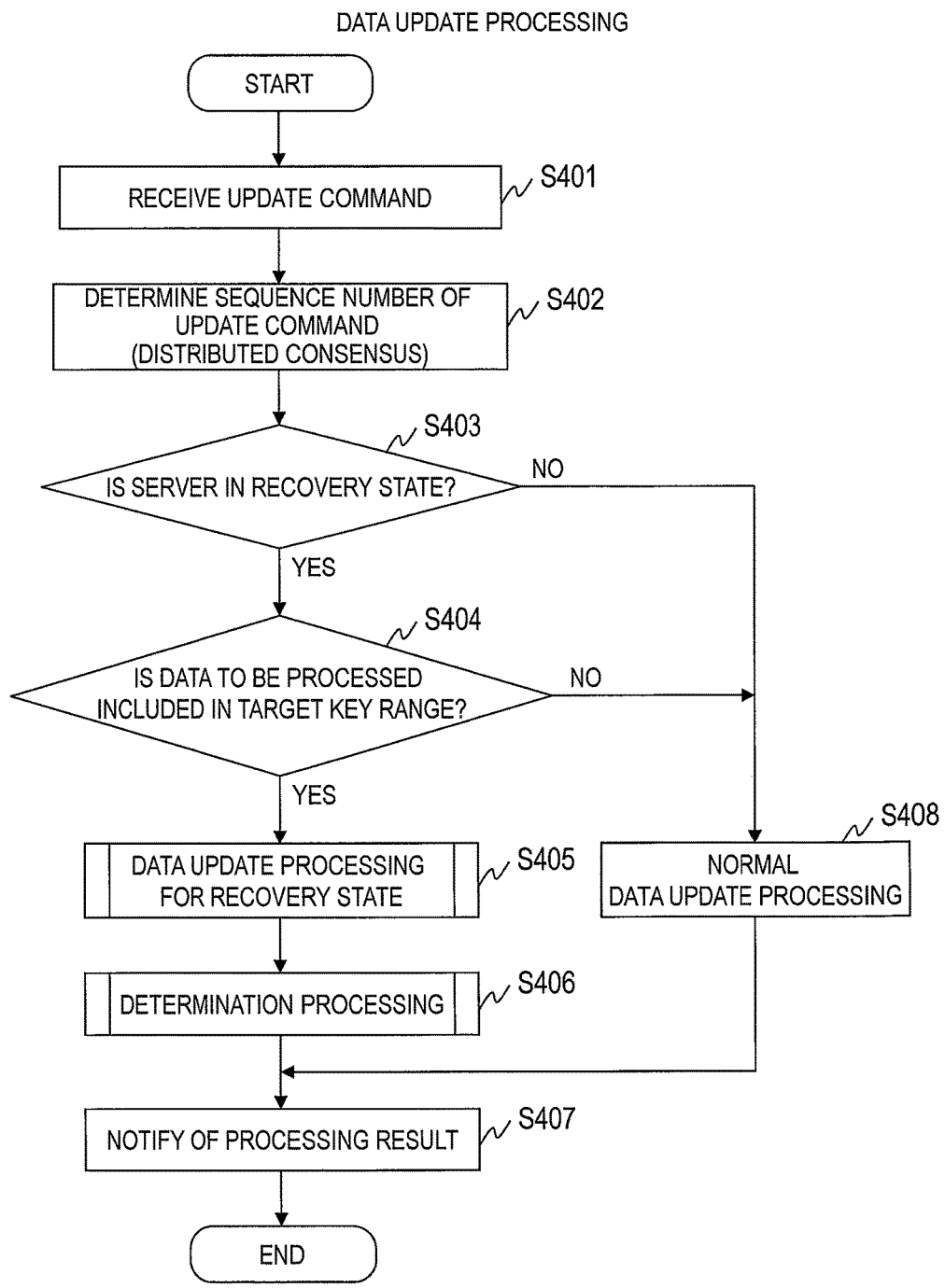
FIG. 10 is a flowchart illustrating data update processing executed by the replication source server according to the first embodiment of this invention.

The above is a description of the processing performed in Step S307. FIG. 10 is a flowchart illustrating data update processing executed by the replication source server 100 according to the first embodiment of this invention. The data update processing is executed under the control of the data management module 151.

The data management module 151 receives an update command from the client apparatus 200 (Step S401).

The data management module 151 determines the sequence number of the update command (Step S402). Specifically, the data management module 151 executes processing such as that described below.

The data management module 151 issues a request to the distributed state machine control module 152 to execute the processing content of the update command and to perform distributed consensus of the update command.

The distributed state machine control module 152 communicates to and from the distributed state machine control module 152 of another server 100 based on a distributed consensus algorithm, delivers a replica of the update command, and determines the sequence number of the update command. The distributed state machine control module 152 outputs the determined sequence number to the data management module 151.

The above is a description of the processing performed in Step S402. Next, the data management module 151 determines whether or not the server 100 is in a recovery state (Step S403). Specifically, the data management module 151 performs processing such as that described below.

The data management module 151 transmits an obtaining request for the recovery information 154 to the recovery control module 153.

In a case where the recovery information 154 exists, the recovery control module 153 outputs the recovery information 154 to the data management module 151. In a case where the recovery information 154 does not exist, the recovery control module 153 outputs an error notification.

In a case where the recovery information has been obtained, the data management module 151 determines that the server 100 is in a recovery state. On the other hand, in a case where the error notification has been obtained, the data management module 151 determines that the server 100 is not in a recovery state.

The above is a description of the processing performed in Step S403.

In a case where it is determined that the server 100 is not in a recovery state, the data management module 151 proceeds to Step S408.

In a case where it is determined that the server 100 is in a recovery state, the data management module 151 determines whether or not the processing target data in the update command is included in the target key range (Step S404).

Specifically, the data management module 151 calculates the hash value of the key included in the update command. The data management module 151 determines whether or not the calculated hash value of the key is included in the target key range based on the calculated hash value of the key and the target key range 602 included in the obtained recovery information 154. In a case where it is determined that the calculated hash value of the key is included in the target key range, the data management module 151 determines that the operation target data is included in the target key range.

In a case where it is determined that the update target data is not included in the target key range, the data management module 151 proceeds to Step S408.

In a case where it is determined that the update target data is included in the target key range, the data management module 151 executes data update processing for the recovery state (Step S405), and then executes determination processing (Step S406). Here, the determination processing is for determining whether or not recovery processing is completed.

The details of the data update processing for the recovery state are described below with reference to FIG. 11. The details of the determination processing are described below with reference to FIG. 12.

The data management module 151 notifies the client apparatus 200 of the processing result (Step S407), and finishes the processing. It should be noted that the other servers 100 (slave servers) also execute the processing from Step S403 to Step S408 in the same manner. This processing is performed independently of the processing of the master server.

In Step S408, the data management module 151 executes normal data update processing, and then proceeds to S407.

In normal data update processing, in a case of adding data, the data management module 151 obtains the exclusive lock, and stores in the data management information 300 the data in which keys, values, and sequence numbers associated with one another. It should be noted that the normal data update processing is a known technology, and hence a detailed description thereof is omitted here.

Figure 11:
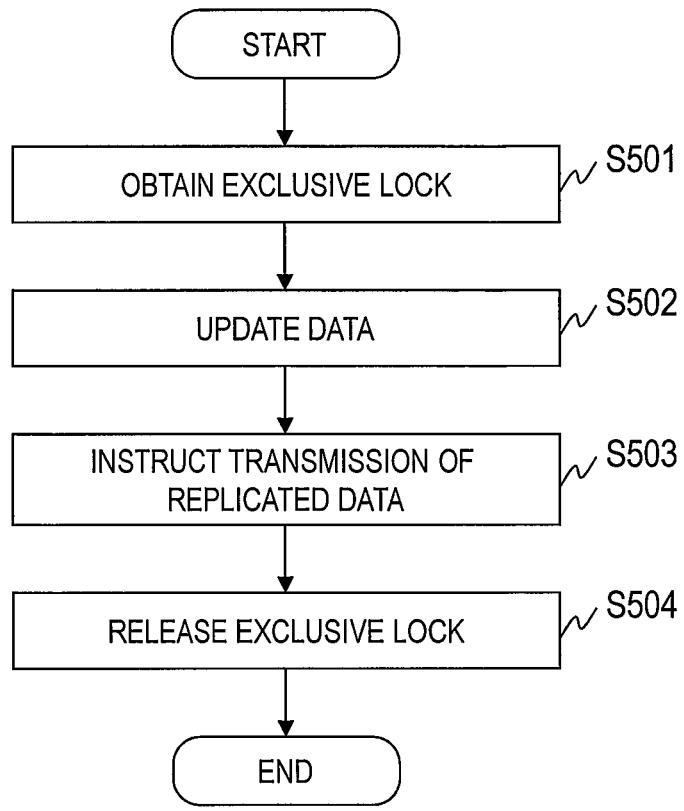
FIG. 11 is a flowchart illustrating data update processing for a recovery state according to the first embodiment of this invention.

FIG. 11 is a flowchart illustrating data update processing for the recovery state according to the first embodiment of this invention. The data update processing for the recovery state is executed under the control of the data management module 151.

The data management module 151 obtains the exclusive lock of the data included in the target key range (Step S501). The exclusive lock prevents data replication from being executed on the target key range. Consequently, data replication and data update processing can be prevented from being carried out simultaneously.

It should be noted that in a case where the exclusive lock of the target key range has been obtained by the data replication, the data management module 151 waits until the exclusive lock is released.

The data management module 151 updates the data based on the update command (Step S502). For example, in a case where the update command corresponds to overwrite processing of the data, the data management module 151 retrieves the update target data, and overwrites the values and sequence number of the retrieved data with predetermined values. It should be noted that the method of updating the data is a known technology, and hence a detailed description thereof is omitted here.

The data management module 151 instructs the recovery control module 153 to transmit replicated data (Step S503). This instruction includes the updated data. In a case where the instruction is received, the recovery control module 153 refers to the recovery information 154, and transmits the updated data to the recovery control module 153 of the replication destination server 100 as the replicated data.

It should be noted that the data management module 151 may transmit the updated data to the recovery control module 153 of the replication destination server 100 as the replicated data. In this case, the data management module 151 obtains the destination information from the recovery control module 153.

The data management module 151 releases the exclusive lock (Step S504), and finishes the processing. At this stage, the data management module 151 instructs the recovery control module 153 to execute determination processing.

It should be noted that depending on the command included in the update command, there may be cases in which the data is not updated. In such a case, the data management module 151 may skip the processing of Step S502 and Step S503.

Now, the exclusive lock control is described.

In each of the data replication and the data update processing for the recovery state, an exclusive lock is obtained. The exclusive lock is obtained in order to control the order of the replicated data to be transmitted based on two processes executed in parallel. In other words, by obtaining the exclusive lock, the replication source server 100 controls so that the two processes are executed in series. Consequently, the data consistency in the distributed KVS can be maintained.

On the other hand, in a case where an exclusive lock is not obtained, due to communication delays and the like, the replication source server 100 may receive the replicated data in an order that produces inconsistent data. For example, in a case where processing is executed in order of overwriting data and then deleting data, due to communication delays, the replication destination server 100 may receive the replicated data in order of deleting data and then overwriting data. In this case, inconsistent data is produced.

Therefore, in the first embodiment, to avoid inconsistent data such as that described above, the replication source server 100 controls the transmission order of the replicated data by executing the two processes in series using the exclusive lock.

It should be noted that, although the execution order of the two processes is controlled using an exclusive lock in this embodiment, this invention is not limited to this. Any method may be used, such as queuing, as long as the two processes are executed in series.

Figure 12:
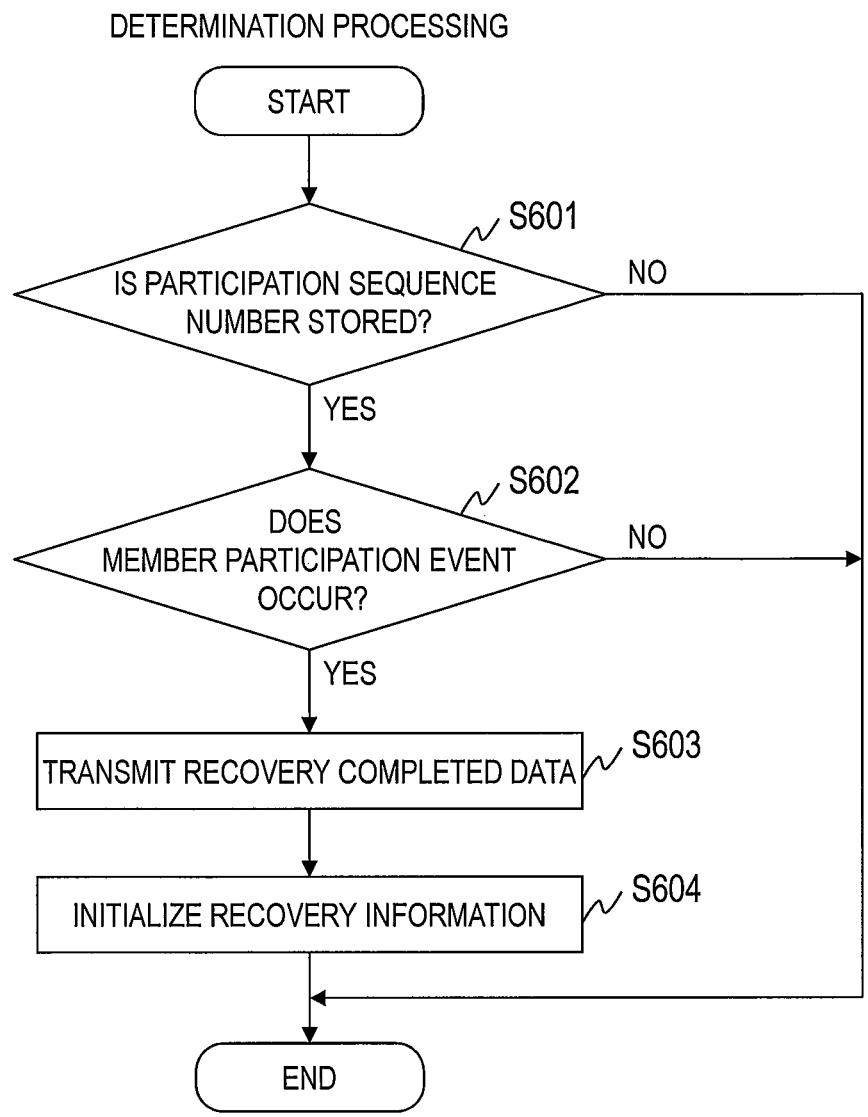
FIG. 12 is a flowchart illustrating determination processing according to the first embodiment of this invention.

FIG. 12 is a flowchart illustrating the determination processing according to the first embodiment of this invention. The determination processing is executed under the control of the recovery control module 153.

The recovery control module 153 starts the processing in a case where an instruction to execute determination processing is received from the data management module 151. First, the recovery control module 153 determines whether or not a participation sequence number is stored in the recovery information 154 (Step S601).

In a case where it is determined that a participation sequence number is not stored in the recovery information 154, the recovery control module 153 finishes the processing.

In a case where it is determined that a participation sequence number is stored in the recovery information 154, the recovery control module 153 determines whether or not a member participation event is to occur (Step S602). Specifically, the recovery control module 153 executes processing such as that described below.

The recovery control module 153 obtains a participation sequence number 604 from the recovery information 154. The recovery control module 153 subtracts the sequence number 501 assigned to the update command in the data update processing (Step S405) executed before the determination processing from the participation sequence number 604. It should be noted that the sequence number 501 is assigned to the distributed state machine event information 500 including the proposition content 502 corresponding to the update command executed in the data update processing for the recovery state.

The recovery control module 153 determines whether or not the calculated value is "1". In a case where the calculated value is "1", the recovery control module 153 determines that a member participation event is to occur.

The above is a description of the processing performed in Step S602.

In a case where it is determined that a member participation event is not to occur, the recovery control module 153 finishes the processing.

In a case where it is determined that a member participation event is to occur, the recovery control module 153 transmits recovery completed data to the recovery control module 153 of the replication destination server 100 (Step S603). The recovery completed data includes the participation sequence number.

The recovery control module 153 initializes the recovery information 154 (Step S604), and finishes the processing. Specifically, the recovery control module 153 deletes all information included in the recovery information 154. Consequently, the recovery state is released.

Figure 13:
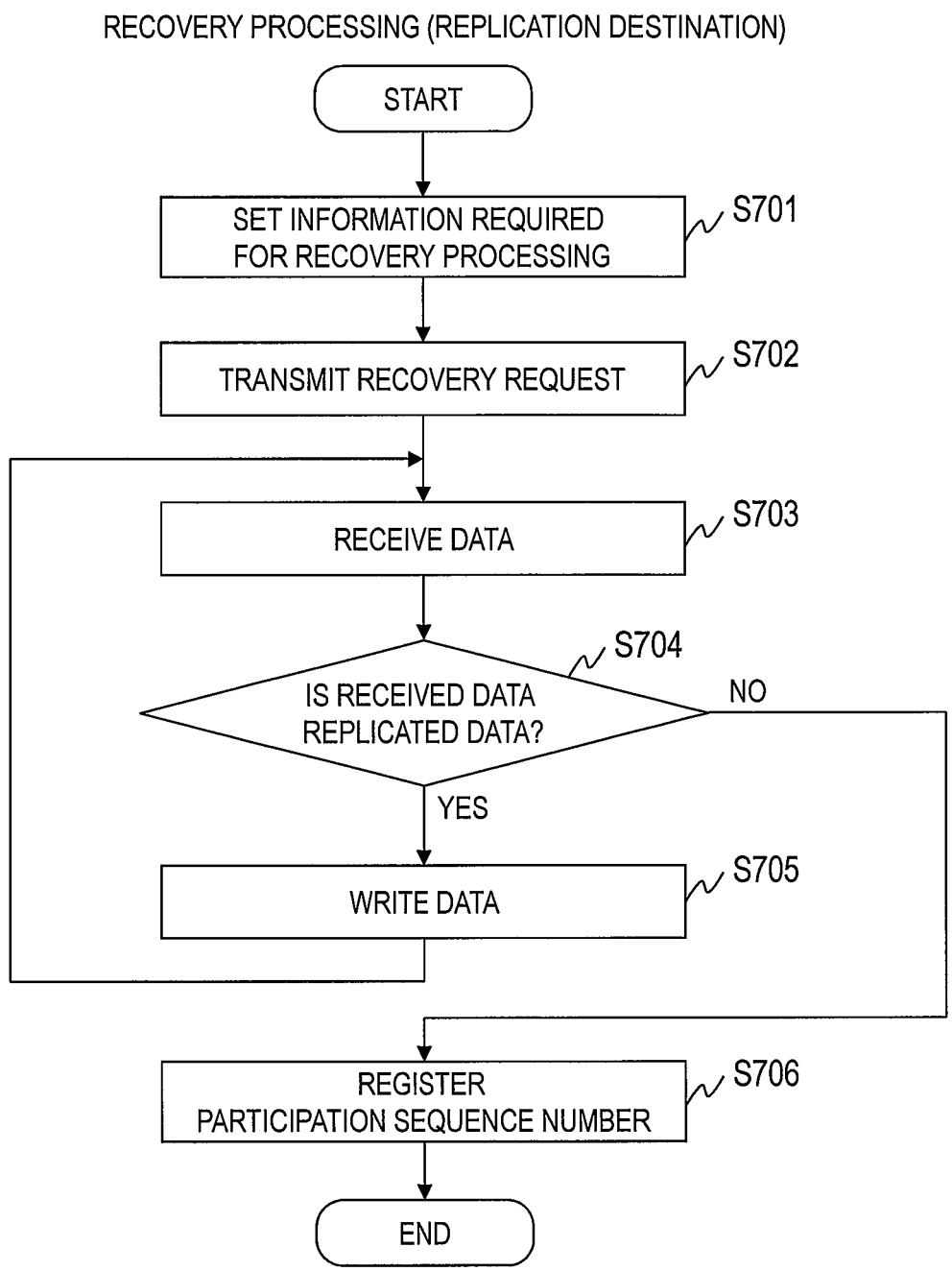
FIG. 13 is a flowchart illustrating recovery processing executed by a replication destination server according to the first embodiment of this invention.

FIG. 13 is a flowchart illustrating recovery processing executed by the replication destination server 100 according to the first embodiment of this invention.

The server 100 sets the information required for recovery processing (Step S701), and based on the set information, transmits a recovery request to the server 100 (Step S702). Specifically, the recovery control module 153 transmits the recovery request to the server 100 based on information set by the user.

In this embodiment, information for specifying the replication source server 100 and the replication destination server is set.

For example, the user sets destination information and the target key range of the replication destination server 100. In this case, based on the set destination information, the recovery request is transmitted to the replication source server 100.

Further, the user sets the target key range. In this case, the replication destination server 100 retrieves the configuration information 170 from another server 100, and searches the master server of the target key range by referring to the obtained configuration information 170. The replication destination server 100 transmits the recovery request to the server 100 corresponding to the retrieved master server.

In a case where the data is received from the another server 100 (Step S703), the server 100 determines whether or not the received data is replicated data (Step S704). Specifically, the recovery control module 153 determines whether or not the received data is replicated data.

In a case where it is determined that the received data is replicated data, the server 100 writes the received data to the data store 160 (Step S705), and returns to Step S703. Specifically, the recovery control module 153 writes the received data to the data store 160. It should be noted that the recovery control module 153 may also ask the data management module 151 to write the data to the data store 160.

In Step S704, in a case where it is determined that the received data is not replicated data, namely, that the received data is recovery completed data, the server 100 registers the participation sequence number (Step S706), and finishes the processing. Specifically, the replication destination server 100 executes processing such as that described below.

The recovery control module 153 obtains the participation sequence number included in the recovery completed data, and outputs a registration request including the obtained participation sequence number to the distributed state machine control module 152.

The distributed state machine control module 152 temporarily holds the participation sequence number. It should be noted that the distributed state machine control module 152 may delete the participation sequence number after the member participation event has occurred.

It should be noted that the server 100 obtains updated configuration information 170 from the replication source server 100. Examples of the method of obtaining the updated configuration information 170 in this invention may include, but are not limited to, an obtaining method in which the replication source server 100 transmits updated configuration information 170 to the replication destination server 100 as one piece of replicated data, and an obtaining method in which the replication source server 100 transmits recovery completed data including updated configuration information 170.

In this embodiment, the recovery request includes the hash value of the target key range. However, the recovery request does not always need to include this hash value. For example, in a case where all of the servers 100 included in the cluster hold the same data, in Step S701, the user does not need to specify a target key range. In this case, all of the data stored in the servers 100 is the target of the data replication.

According to the first embodiment, recovery that maintains the data consistency in the replication source server 100 and the data consistency in the replication destination server 100 can be carried out in a case where data update processing and data replication are executed in parallel.

Further, the amount of memory used in the replication source server 100 can be reduced because it is not necessary to obtain a snapshot during recovery processing. Further, in the recovery processing, the network communication amount can be reduced by transmitting one or a plurality of pieces of replicated data. In addition, it is not necessary to transmit data having the same key a plurality of times because updated data is preferentially transmitted. Consequently, the network communication amount during recovery processing can be reduced.

Further, recovery can be carried out without stopping the application 251 of the client apparatus 200.
(Modified Example of First Embodiment)

In Step S701, the server 100 for executing the data replication may also be selected. Specifically, processing such as that described below may be executed.

In a case where the replication destination server 100 receives the target key range from the user, the replication destination server 100 obtains the configuration information 170 from the servers 100 included in the cluster.

The replication destination server 100 refers to the configuration information 170, and displays information about the master server and the slave server of the target key range to the user. The user selects the server 100 for executing data replication based on the displayed information.

In a case where the master server is selected as the server 100 for executing the data replication, the processing is the same as in the first embodiment.

In a case where a slave server is selected as the server 100 for executing the data replication, the recovery control module 153 includes information for identifying the slave server and an instruction to execute data replication in the recovery request. In addition, the recovery control module 153 transmits the recovery request to the slave server.

The slave server executes the processing illustrated in FIGS. 8 to 12. Consequently, the processing load on the master server can be reduced.
(Second Embodiment)

In the first embodiment, the replication source server 100 controls the reception order of the replicated data for the replication destination server 100 by obtaining an exclusive lock when starting the data replication and the data update processing. Consequently, inconsistencies in the data such as those described above can be avoided.

In a second embodiment of this invention, instead of using an exclusive lock control, the replication destination server 100 writes the replicated data to the data store 160 in consideration of the execution order of the two processes.

The second embodiment is described below while focusing on the differences from the first embodiment.

The system according to the second embodiment includes a buffer that allows the servers 100 to temporarily store data. Other than that, the system according to the second embodiment has the same configuration as in the first embodiment, and hence a description thereof is omitted here.

Further, in the second embodiment, the information stored in the data store 160 is different. Other than that, the information is the same as in the first embodiment, and hence a description thereof is omitted here.

Figure 14:
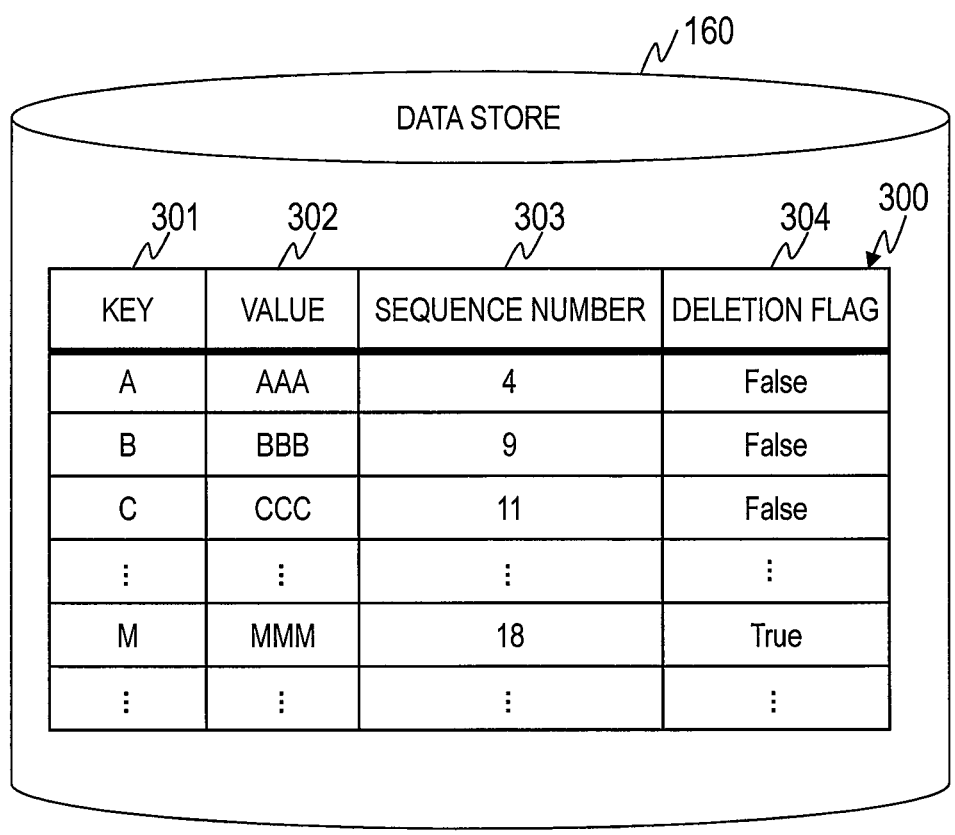
FIG. 14 is an explanatory diagram illustrating a format of the data stored in the data store according to a second embodiment of this invention.

FIG. 14 is an explanatory diagram illustrating a format of the data stored in the data store 160 according to the second embodiment of this invention.

The data management information 300 in the second embodiment newly includes a deletion flag 304.

The deletion flag 304 stores information indicating whether or not the update processing indicates data deletion. In this embodiment, "True" is stored in a case where the update processing indicates data deletion, and "False" is stored in a case where the update processing indicates processing other than data deletion.

Figure 15:
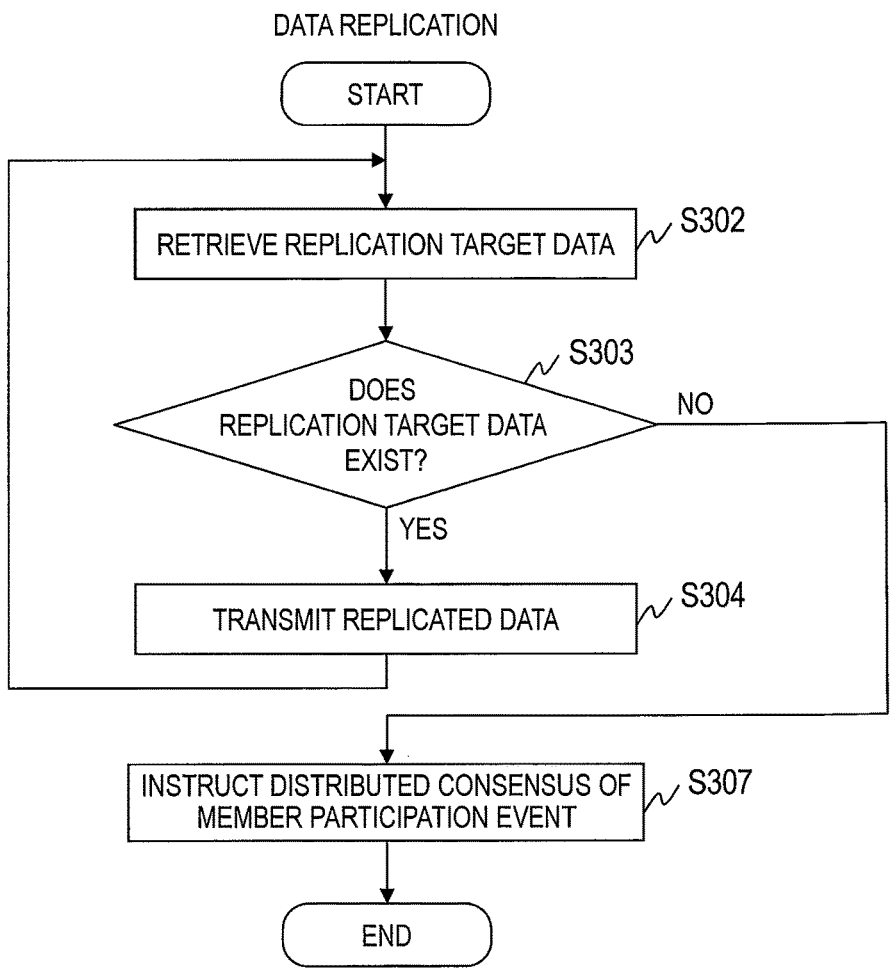
FIG. 15 is a flowchart illustrating data replication executed by the replication source server according to the second embodiment of this invention.

FIG. 15 is a flowchart illustrating data replication executed by the replication source server 100 according to the second embodiment of this invention.

In the second embodiment, the processing of Step S301, Step S305, and Step S306 is omitted. Other than that, the processing is the same as the processing in the first embodiment.

Figure 16:
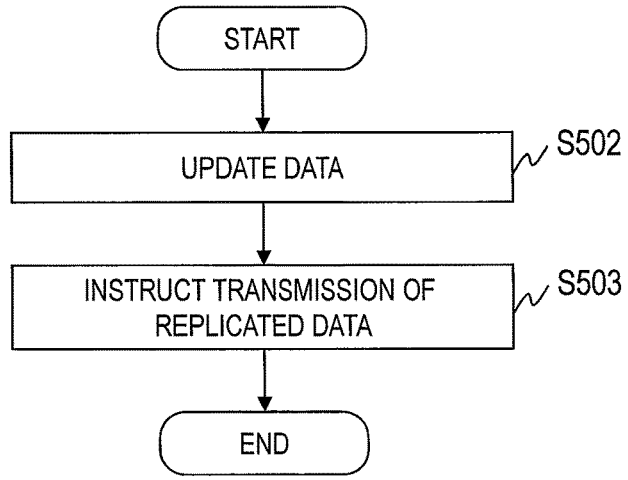
FIG. 16 is a flowchart illustrating data update processing for the recovery state according to the second embodiment of this invention.

FIG. 16 is a flowchart illustrating data update processing for the recovery state according to the second embodiment of this invention.

In the second embodiment, the processing of Step S501 and Step S504 is omitted.

In a case where the update command is a command instructing data deletion, the processing of Step S502 and Step S503 is different. The processing performed in a case where the update command is a command instructing data addition, and in a case where the update command is a command instructing data overwriting, is the same as the processing in the first embodiment.

In Step S502, in a case where the update command is a command instructing data deletion, the data management module 151 retrieves the deletion target data based on the update command. The data management module 151 changes the deletion flag 304 of the retrieved data to "True". In Step S503, the data management module 151 instructs the recovery control module 153 to transmit the replicated data to the replication destination server 100. In the transmission, replicated data having the deletion flag 304 set to "True" is included. Then, the data management module 151 deletes the data having the deletion flag 304 set to "True".

In a case where the recovery control module 153 receives the instruction, the recovery control module 153 refers to the recovery information 154, and transmits the replicated data to the recovery control module 153 of the replication destination server 100.

Figure 17:
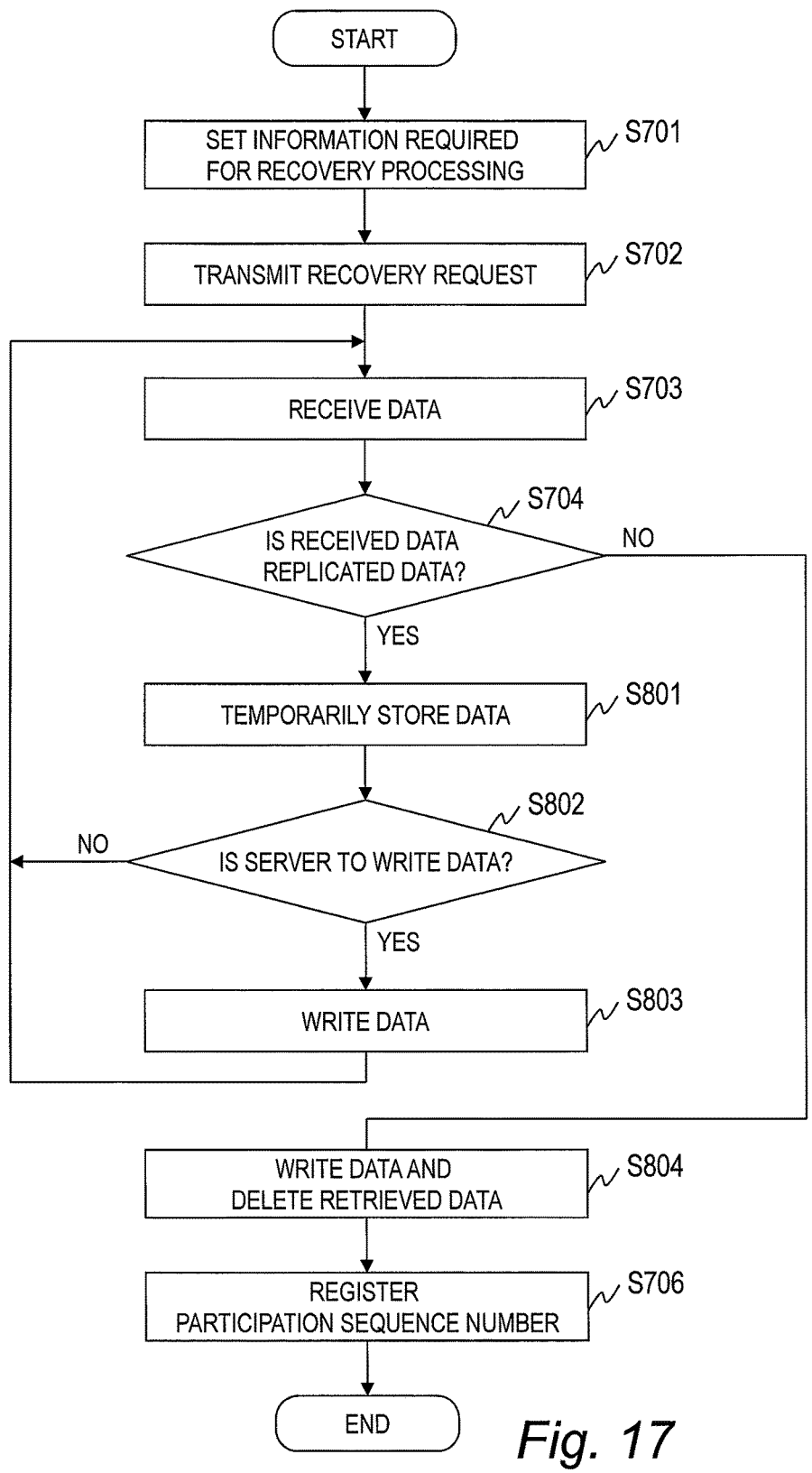
FIG. 17 is a flowchart illustrating recovery processing executed by the replication destination server according to the second embodiment of this invention.

FIG. 17 is a flowchart illustrating recovery processing executed by the replication destination server 100 according to the second embodiment of this invention.

The processing from Step S701 to Step S704 is the same as the processing in the first embodiment.

In Step S704, in a case where it is determined that the received data is replicated data, the server 100 temporarily stores the received replicated data in the buffer (Step S801). Specifically, the recovery control module 153 stores the replicated data in the buffer.

The server 100 determines whether or not to write the data stored in the buffer to the data store 160 (Step S802).

For example, in a case where the amount of data stored in the buffer is equal to or more than a predetermined threshold, the recovery control module 153 writes the data to the data store 160. Alternatively, the recovery control module 153 may include a timer, and be configured to write the data to the data store 160 in a case where a fixed period has elapsed.

In a case where it is determined not to write the replicated data stored in the buffer to the data store 160, the server 100 returns to Step S703.

In a case where it is determined to write the replicated data stored in the buffer to the data store 160, the server 100 writes the replicated data stored in the buffer to the data store 160 (Step S803), and then returns to Step S703. Specifically, the server 100 executes processing such as that described below.

The recovery control module 153 refers to the sequence numbers included in the replicated data stored in the buffer, and selects the replicated data having the smallest sequence number. The recovery control module 153 refers to the key of the selected replicated data, and retrieves the replicated data having the same key as this key from the buffer and the data store 160.

The recovery control module 153 selects the replicated data having the largest sequence number from among the retrieved replicated data, and writes the selected replicated data to the data store 160. Further, the recovery control module 153 deletes the replicated data retrieved from the buffer.

It should be noted that replicated data having the deletion flag 304 set to "True" is also temporarily stored in the data store 160.

The recovery control module 153 determines whether or not data is stored in the buffer. In a case where data is not stored in the buffer, the recovery control module 153 finishes the processing. On the other hand, in a case where data is stored in the buffer, the recovery control module 153 repeatedly executes the same processing.

It should be noted that in the processing described above, although the processing is executed based on the order of the sequence numbers, the processing may also be executed in order of key dictionary registration.

The above is a description of the processing performed in Step S803. In Step S704, in a case where it is determined that the received data is recovery completed data, the server 100 writes the data temporarily stored in the buffer to the data store 160, and then deletes data from the data store 160 based on the deletion flag 304 (Step S804). Specifically, the server 100 executes processing such as that described below.

First, the recovery control module 153 writes the data stored in the buffer to the data store 160. As the data writing method, the same method as used in Step S803 is used. Then, the recovery control module 153 refers to the deletion flag 304 of the data management information 300, and retrieves the data having a deletion flag 304 set to "True". The recovery control module 153 then deletes the retrieved data from the data management information 300.

The above is a description of the processing performed in Step S804.

Processing performed in Step S706 is the same as the processing in the first embodiment, and hence a description thereof is omitted here.

According to the second embodiment, because the replication source server 100 does not need to obtain an exclusive lock, the overhead of processing involved with exclusive lock control can be reduced.

As described above, according to this invention, the network communication amount of the computer system can be reduced because one or a predetermined number of pieces of replicated data are transmitted. Further, because the replication source server 100 does not need to obtain a snapshot during recovery processing, the amount of used memory can be reduced. Further, the network communication amount can be reduced because transmission of data having the same key is suppressed due to the preferential transmission of updated data.

In addition, by controlling the write order of the replicated data, data consistency can be maintained. Because data is written to the replication destination server 100 without stopping update processing, it is not necessary to stop the system. Because the replication destination server 100 is added to the cluster based on a participation sequence number, the consistency of the overall system can be maintained, and at the same time, the configuration of the system can be explicitly changed.

Various types of software illustrated in the present embodiment can be stored in various electromagnetic, electronic, and optical recording media and can be downloaded to a computer via a communication network such as the Internet.

Further, in the present embodiment, although an example of using software-based control has been described, part of the control may be realized by hardware.

While the present invention has been described in detail with reference to the accompanying drawings, the present invention is not limited to the specific configuration, and various changes and equivalents can be made within the scope of the claims.

What is claimed is:

1. A computer system, comprising:
a plurality of computers coupled to one another via a network, the computer system being configured to execute a business task using a database constructed from storage areas included in each of the plurality of computers,
the database being configured to store a plurality of pieces of data, each data includes information identifying the data, a value of the data, and a sequence number indicating an execution order of an event in the database,
the plurality of pieces of data being allocated in a distributed manner across the each of the plurality of computers for each management area determined by applying a partitioning algorithm for a distributed data store to the information identifying the data,
the each of the plurality of computers including:
a data management module configured to manage the allocated data;
a data control module configured to determine the sequence number of an operation on the allocated data; and
a recovery control module configured to transmit replicated data of data included in a predetermined management area to a newly added computer,
the plurality of computers including a first computer configured to transmit a recovery request and a second computer configured to receive the recovery request,
the second computer being configured to execute:
data replication upon receiving the recovery request from the first computer, including: shifting a state of the second computer to a recovery state, reading at least one piece of data from the database based on the sequence numbers of the data stored in the second computer, and for transmitting the read at least one piece of data to the first computer as first replicated data; and
update processing for determining, in a case where an update command to update predetermined data stored in the second computer is received by the second computer while in the recovery state, a sequence number of the update command that is greater than a latest sequence number, for updating predetermined data based on the update command, and for transmitting the updated predetermined data as second replicated data,
wherein the each of the plurality of computers respectively hold histories associating the sequence numbers and content of an event on the database with each other,
wherein the recovery request includes information indicating a management range of a processing target,
wherein in the data replication,
the recovery control module of the second computer is configured to:
hold the latest sequence number as a replication sequence number based on the histories in a case of receiving the recovery request; and
read from the plurality of pieces of data included in the management range of the processing target at least one piece of data that is not transmitted and includes the sequence number older than the replication sequence number, and transmit the read at least one piece of data to the recovery control module of the first computer as the first replicated data,
wherein in the update processing,
the data management module of the second computer updates the predetermined data based on the update command, and outputs to the recovery control module of the second computer an instruction to transmit the first replicated data, and
the recovery control module of the second computer transmits the first replicated data to the recovery control module of the first computer based on the transmission instruction,
wherein at least one of the first computer and the second computer being configured to control a write order indicating an order of writing the first replicated data and the second replicated data by the first computer, and
wherein the first computer being configured to execute write processing for writing, based on the write order, the first replicated data and the second replicated data to the storage areas constructing the database.

2. The computer system according to claim 1,
wherein in the data replication,
the recovery control module of the second computer is configured to:
obtain an exclusive lock of the management range of the processing target;
release the obtained exclusive lock after reading the at least one piece of data to the recovery control module of the first computer as the first replicated data,
wherein in the update processing,
the data management module of the second computer is configured to:
obtain the exclusive lock of the management range of the processing target;
and
release the obtained exclusive lock after updating the predetermined data based on the update command, and output to the recovery control module of the second computer an instruction to transmit the first replicated data, and
wherein in the write processing, the recovery control module of the first computer writes, based on the received order, the first replicated data and the second replicated data to the storage areas constructing the database.

3. The computer system according to claim 1,
wherein the each of the plurality of computers includes an operation storage area for temporarily storing the first replicated data and the second replicated data,
wherein in the write processing,
the recovery control module of the first computer is configured to:
store the received first replicated data and the received second replicated data in the operation storage area;
retrieve from the database and the operation storage area the first replicated data and the second replicated data including information identifying the same data;
refer to the sequence number included in the retrieved first replicated data and the sequence number included in the retrieved second replicated data, and select the replicated data including the newest sequence number; and
write the selected replicated data to the storage areas constructing the database.

4. The computer system according to claim 3,
wherein the data stored in the database further includes a deletion flag indicating whether the data is deletion target data, wherein in the update processing, the data management module of the second computer transmits deletion target data set the deletion flag as the first replicated data to the recovery control module of the first computer in a case where the update command is a command to delete data, and wherein in the write processing, the data management module of the first computer deletes, of the plurality of pieces of data written to the database, data set the deletion flag from the storage areas constructing the database.

5. The computer system according to claim 2, wherein the each of the plurality of computers holds configuration information indicating the management range to be managed by the each of the plurality of computers as a master and the management range to be managed by the each of the plurality of computers as a slave, wherein in the data replication, the recovery control module of the second computer instructs, after the first replicated data including the replication sequence number has been transmitted, the data control module of the second computer to determine a participation sequence number as the sequence number of a participation event for adding the first computer to the plurality of computers, and the data control module of the second computer is configured to:

determine, based on a distributed consensus algorithm, the participation sequence number by communicating to and from the data control module of the each of the plurality of the computers;

hold a history associating the determined participation sequence number and content of the participation event with each other; and output the determined participation sequence number to the recovery control module of the second computer, wherein in the update processing, the data management module of the second computer is configured to:

determine whether the participation event is to occur by comparing, after the first replicated data has been transmitted, the sequence number included in the first replicated data with the participation sequence number; and transmit the participation sequence number to the recovery control module of the first computer in a case where it is determined that the participation event is to occur, and wherein in the participation event, the configuration information is updated so that the first computer is the master of the management range of the processing target.

6. The computer system according to claim 5, wherein the first computer is configured to:

select as the second computer at least one of a computer managing the management area of the processing target as a master or a computer managing the management area of the processing target as a slave; and transmit the recovery request to the selected second computer.

7. A computer system management method performed in a computer system, the computer system including a plurality of computers coupled to one another via a network, the computer system being configured to execute a business task using a database constructed from storage areas included in each of the plurality of computers, the each of the plurality of computers including a processor, a memory coupled to the processor, a network interface coupled to the processor and configured to communicate to and from the plurality of computers other than the each of the plurality of computers via the network, the database being configured to store a plurality of pieces of data, each data includes information identifying the data, a value of the data, and a sequence number indicating an execution order of an event in the database, the plurality of pieces of data being allocated in a distributed manner across the each of the plurality of computers for each management area determined by applying a partitioning algorithm for a distributed data store to the information identifying the data, the each of the plurality of computers further including:

a data management module configured to manage the allocated data;

a data control module configured to determine the sequence number of an operation on the allocated data; and a recovery control module configured to transmit replicated data of data included in a predetermined management area to a newly added computer, the plurality of computers including a first computer configured to transmit a recovery request and a second computer configured to receive the recovery request, the computer system management method comprising:

executing, by the second computer, data replication upon receiving the recovery request from the first computer, including: shifting a state of the second computer to a recovery state, reading at least one piece of data from the database based on the sequence numbers of the data stored in the second computer, and for transmitting the read at least one piece of data to the first computer as first replicated data;

executing, by the second computer, update processing for determining, in a case of receiving an update command to update predetermined data stored in the second computer is received by the second computer while in the recovery state, a sequence number of the update command that is greater than a latest sequence number, for updating predetermined data based on the update command, and for transmitting the updated predetermined data as second replicated data;

wherein the each of the plurality of computers respectively hold histories associating the sequence numbers and content of an event on the database with each other, wherein the recovery request includes information indicating the management range of a processing target, wherein in the data replication, the recovery control module of the second computer is configured to:

hold the latest sequence number as a replication sequence number based on the histories in a case of receiving the recovery request; and read from the plurality of pieces of data included in the management range of the processing target at least one piece of data that is not transmitted and includes the sequence number older than the replication sequence number, and transmit the read at least one piece of data to the recovery control module of the first computer as the first replicated data, wherein in the update processing, the data management module of the second computer updates the predetermined data based on the update command, and outputs to the recovery control module of the second computer an instruction to transmit the first replicated data, and the recovery control module of the second computer transmits the first replicated data to the recovery control module of the first computer based on the transmission instruction, and controlling, by at least one of the first computer and the second computer, a write order indicating an order of writing the first replicated data and the second replicated data by the first computer; and executing, by the first computer, write processing for writing, based on the write order, the first replicated data and the second replicated data to the storage areas constructing the database.

8. The computer system management method according to claim 7, wherein the data replication includes:

obtaining, by the recovery control module of the second computer, an exclusive lock of the management range of the processing target;

releasing, by the recovery control module of the second computer, the obtained exclusive lock after reading the at least one piece of data to the recovery control module of the first computer as the first replicated data, wherein the update processing includes:

obtaining, by the data management module of the second computer, the exclusive lock of the management range of the processing target;

releasing, by the data management module of the second computer, the obtained exclusive lock after updating the predetermined data based on the update command, and output to the recovery control module of the second computer an instruction to transmit the first replicated data, wherein the write processing includes writing, by the recovery control module of the first computer, based on the received order, the first replicated data and the second replicated data to the storage areas constructing the database.

9. The computer system management method according to claim 7, wherein the each of the plurality of computers includes an operation storage area for temporarily storing the first replicated data and the second replicated data, wherein the write processing includes:

storing, by the recovery control module of the first computer, the received first replicated data and the received second replicated data in the operation storage area;

retrieving, by the recovery control module of the first computer, from the database and the operation storage area, the first replicated data and the second replicated data including information identifying the same data;

referring, by the recovery control module of the first computer, to the sequence number included in the retrieved first replicated data and the sequence number included in the retrieved second replicated data, and selecting the replicated data including the newest sequence number; and writing, by the recovery control module of the first computer, the selected replicated data to the storage areas constructing the database.

10. The computer system management method according to claim 9, wherein the data stored in the database further includes a deletion flag indicating whether the data is deletion target data, wherein the update processing includes transmitting, by the data management module of the second computer, deletion target data set the deletion flag as the first replicated data to the recovery control module of the first computer in a case where the update command is a command to delete the data, and wherein the write processing includes deleting, by the data management module of the first computer, of the plurality of pieces of data written to the database, data set the deletion flag from the storage areas constructing the database.

11. The computer system management method according to claim 8, wherein the each of the plurality of computers holds configuration information indicating the management range to be managed by the each of the plurality of computers as a master and the management range to be managed by the each of the plurality of computers as a slave, wherein the data replication includes:

instructing, by the recovery control module of the second computer, after the first replicated data including the replication sequence number has been transmitted, the data control module of the second computer to determine a participation sequence number as the sequence number of a participation event for adding the first computer to the plurality of computers;

determining, by the data control module of the second computer, based on a distributed consensus algorithm, the participation sequence number by communicating to and from the data control module of the each of the plurality of the computers;

holding, by the data control module of the second computer, a history associating the determined participation sequence number and content of the participation event with each other; and outputting, by the data control module of the second computer, the determined participation sequence number to the recovery control module of the second computer, wherein the update processing includes:

determining, by the data management module of the second computer, whether the participation event is to occur by comparing, after the first replicated data has been transmitted, the sequence number included in the first replicated data with the participation sequence number; and transmitting, by the data management module of the second computer, the participation sequence number to the recovery control module of the first computer in a case where it is determined that the participation event is to occur, and wherein in the participation event, the configuration information is updated so that the first computer is the master of the management range of the processing target.

12. The computer system management method according to claim 11, further including:

selecting, by the first computer, as the second computer, at least one of a computer managing the management area of the processing target as a master or a computer managing the management area of the processing target as a slave; and transmitting, by the first computer, the recovery request to the selected second computer.

13. A program stored in a non-transitory computer readable medium to be executed by each of a plurality of computers coupled to one another via a network which are included in a computer system configured to execute a business task using a database constructed from storage areas included in the each of the plurality of computers,
the each of the plurality of computers including a processor, a memory coupled to the processor, and a network interface coupled to the processor and configured to communicate to and from the plurality of computers other than the each of the plurality of computers via the network,
the database being configured to store a plurality of pieces of data, each data includes information identifying the data, a value of the data, and a sequence number indicating an execution order of an event in the database,
the plurality of pieces of data being allocated in a distributed manner across the each of the plurality of computers for each management area determined by applying a partitioning algorithm for a distributed data store to the information identifying the data,
the each of the plurality of computers including:
a data management module configured to manage the allocated data;
a data control module configured to determine the sequence number of an operation on the partitioned data; and
a recovery control module configured to transmit replicated data of data included in a predetermined management area to a newly added computer,
the plurality of computers including a first computer configured to transmit a recovery request and a second computer configured to receive the recovery request,
the program being configured to control the each of the plurality of computers to execute procedures comprising:
executing data replication, by the second computer, upon receiving a recovery request from another of the plurality of computers, including: shifting a state of the each of the plurality of computers to a recovery state, reading at least one piece of the data stored in the database based on the sequence numbers of the data stored in the second computer, and for transmitting the read at least one piece of data to the another of the plurality of computers as first replicated data;
executing update processing, by the second computer, for determining, in a case of receiving an update command to update predetermined data stored in the second computer is received by the second computer while in the recovery state, a sequence number of the update command that is greater than a latest sequence number, for updating predetermined data based on the update command, and for transmitting the updated predetermined data as second replicated data,
wherein the each of the plurality of computers respectively hold histories associating the sequence numbers and content of an event on the database with each other,
wherein the recovery request includes information indicating the management range of a processing target,
wherein in the data replication, the recovery control module of the second computer is configured to:
hold the latest sequence number as a replication sequence number based on the histories in a case of receiving the recovery request, and
read from the plurality of pieces of data included in the management range of the processing target at least one piece of data that is not transmitted and includes the sequence number older than the replication sequence number, and transmit the read at least one piece of data to the recovery control module of the first computer as the first replicated data,
wherein in the update processing,
the data management module of the second computer updates the predetermined data based on the update command, and outputs to the recovery control module of the second computer an instruction to transmit the first replicated data, and
the recovery control module of the second computer transmits the first replicated data to the recovery control module of the first computer based on the transmission instruction,
wherein at least one of the first computer and the second computer executes controlling a write order indicating an order of writing the first replicated data and the second replicated data in the another of the plurality of computers, and
wherein the first computer executes write processing for writing, based on the write order, the first replicated data and the second replicated data to the storage areas constructing the database.

14. The program stored in the non-transitory computer readable medium according to claim 13,
wherein the data replication includes the procedures of:
obtaining, by the recovery control module of the each of the plurality of computers, an exclusive lock of the management range of the processing target;
releasing, by the recovery control module of the each of the plurality of computers, the obtained exclusive lock after reading the at least one piece of data to the recovery control module of the first computer as the first replicated data, and
wherein the update processing includes the procedures of:
obtaining, by the data management module of the each of the plurality of computers, the exclusive lock of the management range of the processing target;
releasing, by the data management module of the each of the plurality of computers, the obtained exclusive lock after updating the predetermined data based on the update command, and output to the recovery control module of the second computer an instruction to transmit the first replicated,
wherein in the write processing, the recovery control module of the first computer writes, based on the received order, the first replicated data and the second replicated data to the storage areas constructing the database.

* * * * *